US009613743B2

(12) United States Patent
Doljack

(10) Patent No.: US 9,613,743 B2
(45) Date of Patent: Apr. 4, 2017

(54) OPTIMIZED ELECTROMAGNETIC TRANSFORMER COMPONENT DESIGN AND METHODS INCLUDING IMPROVED CONDUCTIVITY COMPOSITE CONDUCTOR MATERIAL

(71) Applicant: COOPER TECHNOLOGIES COMPANY, Houston, TX (US)

(72) Inventor: Frank Anthony Doljack, Pleasanton, CA (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 275 days.

(21) Appl. No.: 14/511,332

(22) Filed: Oct. 10, 2014

(65) Prior Publication Data

US 2016/0104567 A1 Apr. 14, 2016

(51) Int. Cl.

| | |
|---|---|
| ***H02J 1/00*** | (2006.01) |
| ***H01F 5/00*** | (2006.01) |
| ***H01F 27/28*** | (2006.01) |
| *H01F 41/079* | (2016.01) |

(52) U.S. Cl.
CPC ....... *H01F 27/2823* (2013.01); *H01F 41/079* (2016.01)

(58) Field of Classification Search
CPC ........................... H01F 27/2823; H01F 41/079
USPC ............................................. 363/15; 336/200
See application file for complete search history.

(56) References Cited

U.S. PATENT DOCUMENTS

2012/0020117 A1* 1/2012 Arnold .................... H01F 29/10 363/15

* cited by examiner

*Primary Examiner* — Farhana Hoque
(74) *Attorney, Agent, or Firm* — Armstrong Teasdale LLP

(57) ABSTRACT

Electromagnetic transformer components include a magnetic core and at least two conductors assembled with the core and defining respective windings completing different numbers of turns. The conductors are fabricated from a composite material including carbon nanotubes having an improved conductivity. The transformer is fabricated to have performance parameters that are selected in view of a function of a ratio of conductivity and/or a function of a ratio of effective diameter of the composite conductor material relative to a reference conductor material as conventionally used in a transformer fabrication.

46 Claims, 15 Drawing Sheets

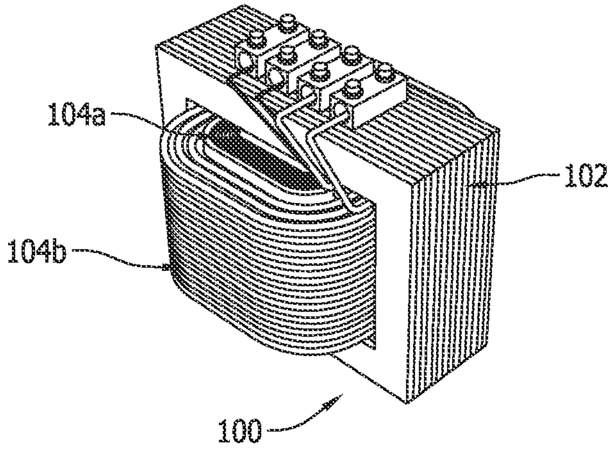
FIG. 1
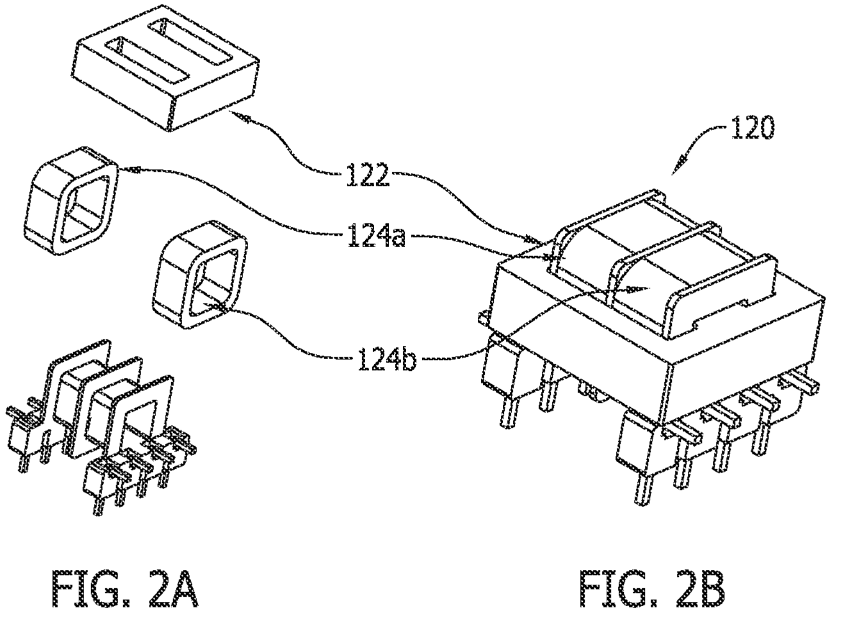
FIG. 2A
FIG. 2B
FIG. 2

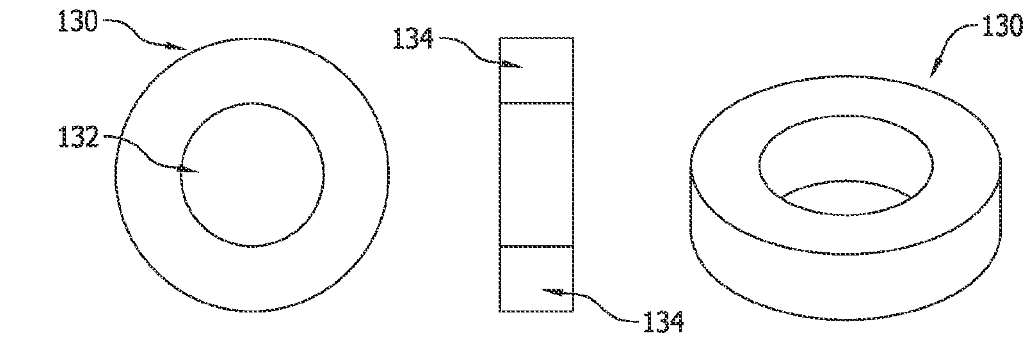
FIG. 3A FIG. 3B FIG. 3C
FIG. 3
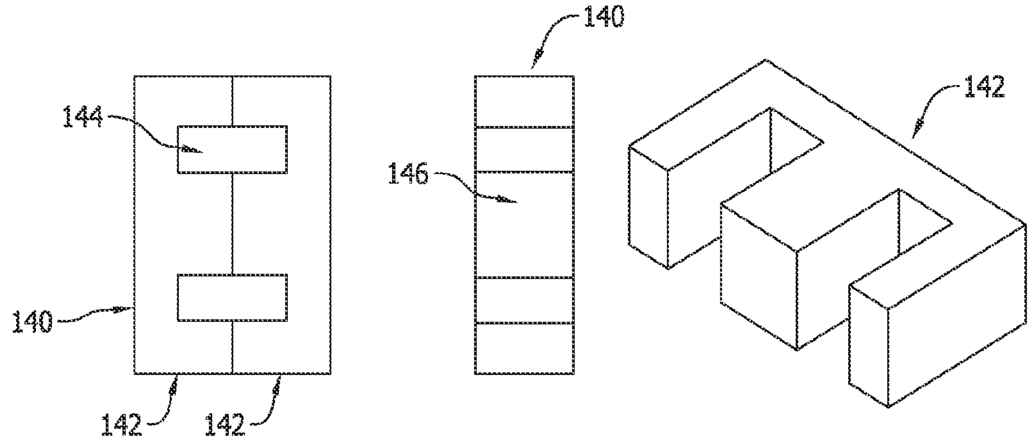
FIG. 4A FIG. 4B FIG. 4C
FIG. 4

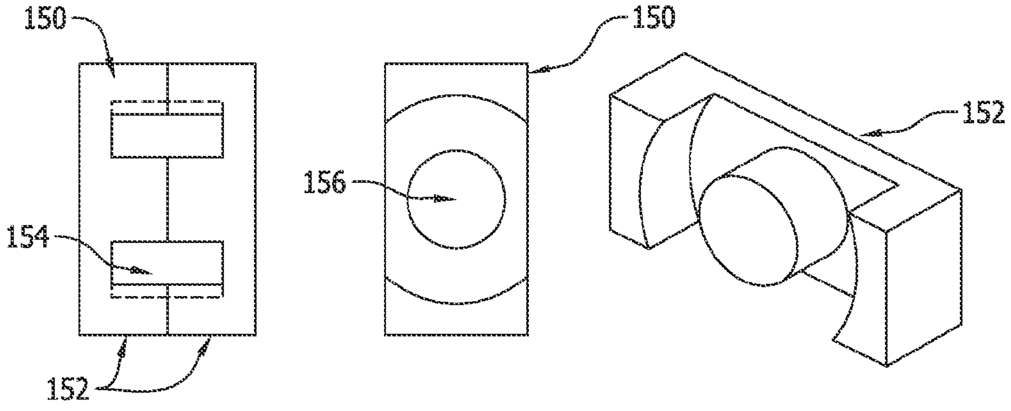
FIG. 5A FIG. 5B FIG. 5C
FIG. 5
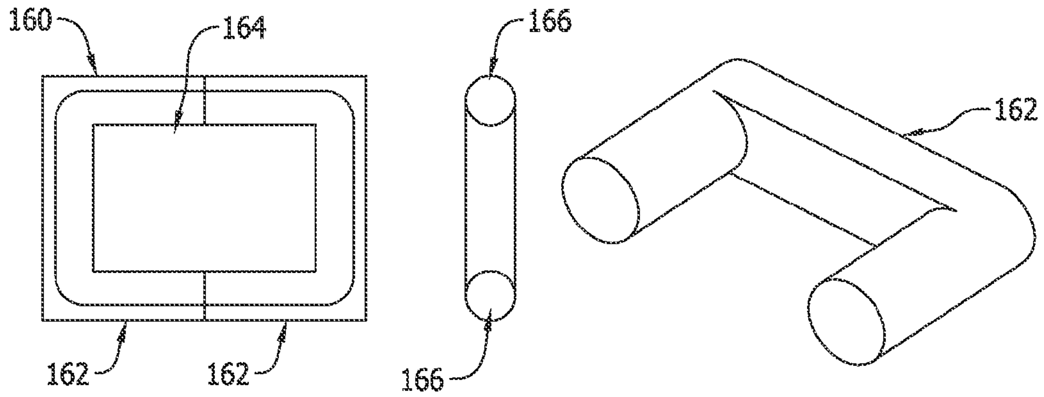
FIG. 6A FIG. 6B FIG. 6C
FIG. 6

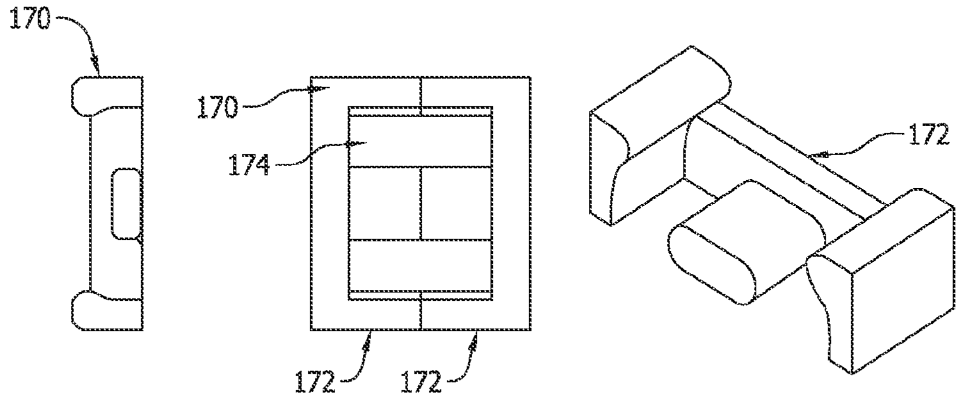
FIG. 7A FIG. 7B FIG. 7C
FIG. 7
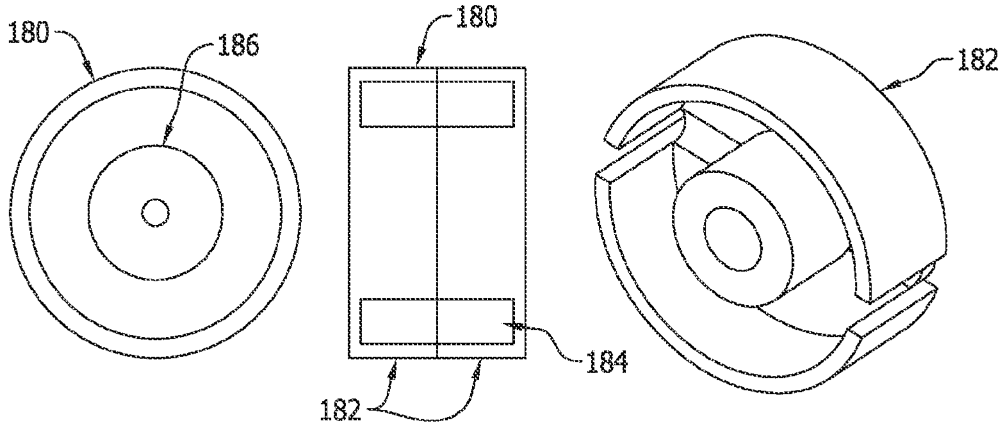
FIG. 8A FIG. 8B FIG. 8C
FIG. 8

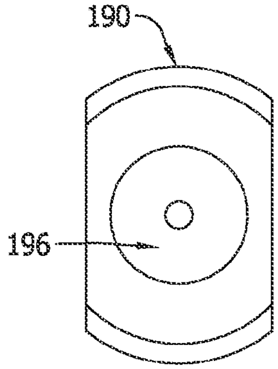
FIG. 9A
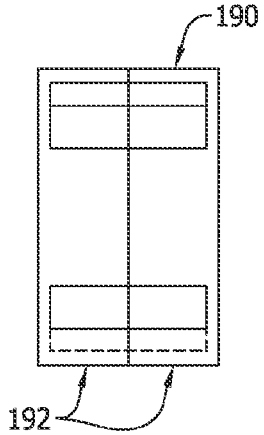
FIG. 9B
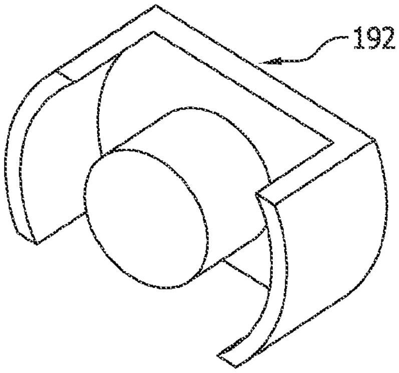
FIG. 9C
FIG. 9
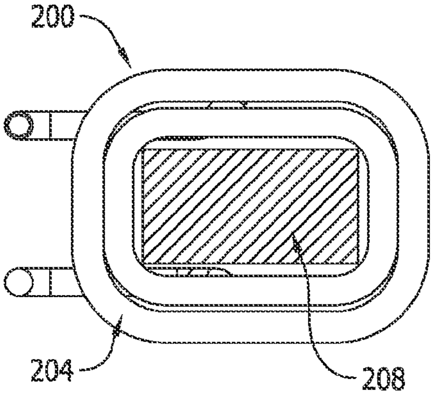
FIG. 10A
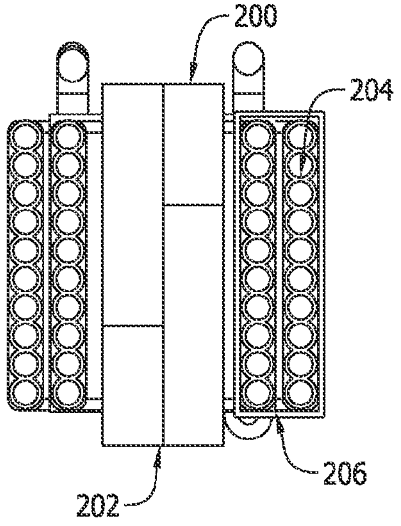
FIG. 10B
FIG. 10

OPTIMIZED ELECTROMAGNETIC TRANSFORMER COMPONENT DESIGN AND METHODS INCLUDING IMPROVED CONDUCTIVITY COMPOSITE CONDUCTOR MATERIAL

BACKGROUND OF THE INVENTION

The field of the invention relates generally to the design and manufacture of electromagnetic components and related methods, and more particularly to the design and manufacture of electromagnetic transformer components for electronic devices and applications.

Electromagnetic components are known that utilize electric current and magnetic fields to provide a desired effect in an electrical circuit. Transformers are one well known type of electromagnetic components that include at least one pair of coils or windings, sometimes referred to as a primary winding and as secondary winding. Electrical current flow through the primary winding induces a magnetic field within a magnetic core, which in turn induces electrical current flow in the secondary winding. Depending on the relative number of turns in the primary and secondary windings, the current output in the secondary winding may be increased or decreased relative to the current flow in the primary winding. Voltage and current transformers are known that function to convert an input voltage or input current having a first magnitude to an output voltage or output current having a second magnitude different from the first magnitude. Such transformers are sometimes referred to as step-up and step-down transformers.

Recent trends to produce increasingly powerful, yet smaller electronic devices have led to numerous challenges to the electronics industry. Electronic devices such as smart phones, personal digital assistant (PDA) devices, entertainment devices, and portable computer devices, to name a few, are now widely owned and operated by a large, and growing, population of users. Such devices include an impressive, and rapidly expanding, array of features allowing such devices to interconnect with a plurality of communication networks, including but not limited to the Internet, as well as other electronic devices. Rapid information exchange using wireless communication platforms is possible using such devices, and such devices have become very convenient and popular to business and personal users alike.

For surface mount component manufacturers for circuit board applications required by such electronic devices, the challenge has been to provide increasingly miniaturized components so as to minimize the area occupied on a circuit board by the component (sometimes referred to as the component "footprint") and also its height measured in a direction perpendicular to a plane of the circuit board (sometimes referred to as the component "profile"). By decreasing the footprint and profile, the size of the circuit board assemblies for electronic devices can be reduced and/or the component density on the circuit board(s) can be increased, which allows for reductions in size of the electronic device itself or increased capabilities of a device with comparable size. Miniaturizing electromagnetic components in a cost effective manner has introduced a number of practical challenges to electromagnetic component manufacturers in a highly competitive marketplace. Because of the high volume of components needed for electronic devices in great demand, cost reduction in fabricating components has been of great practical interest to electromagnetic component manufacturers.

In order to meet increasing demand for electronic devices, especially hand held devices, each generation of electronic devices need to be not only smaller, but offer increased functional features and capabilities. As a result, the electronic devices must be increasingly powerful devices. For some types of components, such as electromagnetic transformer components used in the power supply circuitry for the devices, meeting increased power demands while continuing to reduce the size of components that are already quite small, has proven challenging.

BRIEF DESCRIPTION OF THE DRAWINGS

Non-limiting and non-exhaustive embodiments are described with reference to the following figures, wherein like reference numerals refer to like parts throughout the various drawings unless otherwise specified.

FIG. 1 is a perspective view of a first exemplary embodiment of an electromagnetic transformer component formed in accordance with an exemplary embodiment of the present invention and including an improved conductivity composite conductor material.

FIG. 2 depicts an exploded view in FIG. 2A, and a perspective assembly view in FIG. 2B of a second exemplary embodiment of an electromagnetic transformer component formed in accordance with an exemplary embodiment of the present invention and including an improved conductivity composite conductor material.

FIG. 3 depicts an exemplary magnetic core configuration in plan view in FIG. 3*a*, cross sectional view in FIG. 3*b* and in perspective view in FIG. 3*c* that may be utilized in an electromagnetic transformer component formed in accordance with an exemplary embodiment of the present invention and including an improved conductivity composite conductor material.

FIG. 4 depicts an exemplary magnetic core configuration in plan view in FIG. 4*a*, cross sectional view in FIG. 4*b* and in perspective view in FIG. 4*c* that may be utilized in an electromagnetic transformer component formed in accordance with an exemplary embodiment of the present invention and including an improved conductivity composite conductor material.

FIG. 5 depicts an exemplary magnetic core configuration in plan view in FIG. 5A, cross sectional view in FIG. 5B and in perspective view in FIG. 5C that may be utilized in an electromagnetic transformer component formed in accordance with an exemplary embodiment of the present invention and including an improved conductivity composite conductor material.

FIG. 6 depicts an exemplary magnetic core configuration in plan view in FIG. 6*a*, cross sectional view in FIG. 6*b* and in perspective view in FIG. 6*c* that may be utilized in an exemplary embodiment of an electromagnetic transformer component such as a transformer formed in accordance with an exemplary embodiment of the invention and including an improved conductivity composite conductor material.

FIG. 7 depicts an exemplary magnetic core configuration in plan view in FIG. 7*a*, cross sectional view in FIG. 7*b* and in perspective view in FIG. 7*c* that may be utilized in an exemplary embodiment of an electromagnetic transformer component formed in accordance with an exemplary embodiment of the present invention and including an improved conductivity composite conductor material.

FIG. 8 depicts an exemplary magnetic core configuration in plan view in FIG. 8*a*, cross sectional view in FIG. 8*b* and in perspective view in FIG. 8*c* that may be utilized in an exemplary embodiment of an electromagnetic transformer component formed in accordance with an exemplary embodiment of the present invention and including an improved conductivity composite conductor material.

FIG. 9 depicts an exemplary magnetic core configuration in plan view in FIG. 9*a*, cross sectional view in FIG. 9*b* and in perspective view in FIG. 9*c* that may be utilized in an exemplary embodiment of an electromagnetic transformer component formed in accordance with an exemplary embodiment of the present invention and including an improved conductivity composite conductor material.

FIG. 10 depicts an exemplary transformer component including a magnetic core configuration in plan view in FIG. 10*a*, and in cross sectional view in FIG. 10*b* that may be utilized in an exemplary embodiment of an electromagnetic transformer component formed in accordance with an exemplary embodiment of the present invention and including an improved conductivity composite conductor material.

DETAILED DESCRIPTION OF THE INVENTION

Figure 11:
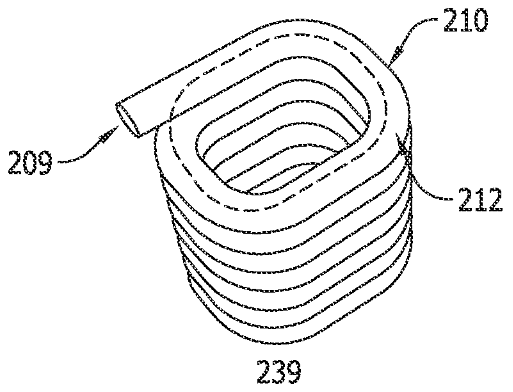
FIG. 11 is a perspective view of an exemplary winding configuration that may be utilized in an exemplary embodiment of an electromagnetic transformer component formed in accordance with an exemplary embodiment of the present invention and including an improved conductivity composite conductor material.

Exemplary embodiments of inventive electromagnetic transformer designs, assemblies and constructions, and also related methodologies and methods of transformer component design and manufacture, are described below that, among other things, facilitate the design and manufacture of optimal electromagnetic transformer components in applications such as power circuitry for higher current and higher power applications yet having low profiles that are difficult, if not impossible, to achieve, using conventional electromagnetic component design and fabrication techniques. Electromagnetic transformer components may also be fabricated with reduced cost compared to other known miniaturized transformer component constructions. Manufacturing methodology and steps associated with the devices described are in part apparent and in part specifically described below but are believed to be well within the purview of those in the art without further explanation.

As used, herein, the term “transformer” shall refer to an electromagnetic component provided for achieving a step increase or step decrease in current or voltage in an electrical circuit. Transformers are designed to induce a magnetic field in a magnetic core as current flows through a primary winding having a first number of turns, and from that magnetic field to induce a current in a secondary winding having a second number of turns that is a ratio of the turns of the primary winding. The current output from the secondary winding may accordingly be increased or decreased by the ratio provided in the primary and secondary windings.

For clarity, the term “transformer” as used herein is distinguishable from other types of electromagnetic components, and more specifically from inductor components, including but not limited to power and non-power inductors. While transformers and inductors both operate using electromagnetic principles, there are fundamental differences between them from a component design and fabrication perspective.

A "power inductor" shall refer to an electromagnetic component provided in power supply management applications and power management circuitry on circuit boards for powering a host of electronic devices, including but not necessarily limited to hand held electronic devices. Power inductors are designed to induce magnetic fields in magnetic cores via current flowing through one or more conductive windings, and store energy via the generation of magnetic fields in magnetic cores associated with the windings. Power inductors also return the stored energy to the associated electrical circuit as the current through the winding and may, for example, provide regulated power from rapidly switching power supplies. Unlike a power inductor, a transformer is typically not designed to store energy via the generation of magnetic fields. In a transformer, energy storage in the magnetic core effectively amounts to an undesirable, parasitic power loss in the circuitry.

As used herein, the term "non-power inductor," amongst other things, shall refer to an electromagnetic component provided for filtering purposes in an electrical circuit, and is distinguishable from a power inductor. Such non-power inductors are sometimes referred to as noise suppression components and typically operate on signal lines, as opposed to power lines, in the circuitry. For example, one type of non-power inductor is designed to induce magnetic fields in a magnetic core via current flowing through more than one conductive winding in opposite directions to one another, with the magnetic fields cancelling one another to remove undesirable noise. Unlike a non-power inductor, a transformer is not designed to filter or suppress any aspect of a signal, but rather only to change its magnitude.

Each type of electromagnetic component described above therefore utilizes principles of magnetism and inductance via current flow through electrical conductors, but in different ways to achieve a desired result. The different ways that the principles of inductance and desired results are obtained are reflected by structural differences in the devices that allow such disparate results to occur. As such, neither power inductor components nor non-power inductor components are generally capable of serving as a transformer, nor are transformer components generally capable of serving as power or non-power inductor components. Instead of being interchangeable components, each type of electromagnetic component described above is typically custom designed for a particular application and environment, and even in the same application or environment, power inductors, non-power inductors, and transformers may be provided as discrete components that are used in combination with each component providing its own unique function in the circuitry.

As appreciated by those in the art, the basic function of a transformer is to transfer electrical energy from one circuit to another by electromagnetic induction (transformer action). The electrical energy is always transferred without a change in frequency, but instead involves changes in magnitude of voltage and current between the input (sometimes referred to as the line side) and output side (sometimes referred to as the load side) of the transformer component. A varying magnetic flux is generated in a magnetic core of the transformer in response to a varying current flowing through the primary winding of the transformer. This varying magnetic field and associated electromotive force induces a voltage in the secondary winding(s).

Today's transformers are highly efficient, but still are disadvantaged in some aspects, and improvements in transformer efficiency remain desired but are elusive to transformer component manufacturers in the present state of the art. Inefficiencies of transformer components are primarily attributable to two major types of power loss, namely the core loss and copper loss of the transformer component in operation. Improvements in either core loss and copper loss are desired.

The engineering principles of electromagnetic transformer component design are well known but difficult to apply in some aspects, and as a result the manufacture of electromagnetic transformer components is partly experimental in nature. That is, electromagnetic transformer component manufacturers tend to adopt transformer designs through an iterative process wherein a design may be developed in a theoretical manner, prototypes of the design may be made and tested to evaluate the theoretical design, changes are proposed in view of the test results, and another round of components is made and tested. Such a process may be, and has been, successfully accomplished to provide satisfactory electromagnetic transformer, components meeting desired specifications in certain aspects. To some extent, because of the number of transformer designs that are known for certain applications, the theoretical design step may be omitted and one may instead attempt to simply change an existing transformer design and proceed with testing of prototypes to assess the impact of the change.

Because of the experimental nature of the electromagnetic transformer component design, a design may be achieved that meets a desired specification but is nonetheless suboptimal. Because the impact of a design change in one aspect of the transformer component design and manufacture to other aspects of the resultant transformer component are not well understood or easy to predict, there is typically some trial and error in arriving at a final transformer design that meets a specification in a desired attribute, but once the specification is met it may have negatively (and unknowingly) affected another performance attribute. This is perhaps even more so in the manufacture of miniaturized transformer components that may be surface mounted to circuit boards in smaller packages and design envelopes to facilitate the manufacture of increasingly smaller and/or increasingly powerful portable electronic devices.

Any transformer component will include at least one pair of electrically conductive coils or windings (i.e., at least one primary winding and at least one secondary winding) and a magnetic core. The basic, theoretical design of the transformer component may proceed with the applicable known relationships including but not limited to those discussed further below, and when connected to an energized electrical circuit), the primary and secondary coils define a number of turns of a winding in a predetermined ratio to achieve a desired step-up or step-down output effect (i.e., to achieve the desired change in magnitude of the transformer output to the transformer input in the circuitry). Transformer components may be varied considerably for different applications by varying the number of turns in the primary and secondary winding(s), the arrangement of the turns of the winding in the magnetic core, the cross sectional area of the turns in the winding, and the properties of the magnetic core materials themselves. The magnetic core may be constructed in one piece or multiple pieces.

A great focus is reflected in the patent literature regarding the development of magnetic core materials that can enhance the performance of electromagnetic transformer components in various applications, and a great variety of different shapes of the magnetic cores is also reflected in the patent literature to achieve desired transformer characteristics. In some cases, separate core pieces are combined to define a magnetic core structure. In other cases, single piece, monolithic cores structures may be provided to embed, encase or surround portions of the primary and secondary windings. The core pieces may be fabricated from granular, magnetic powder materials in a pressing operation, or may alternatively be laminated using layers of pre-formed materials that are joined or united as layers, or still further may be successively formed in layers one upon another in the fabrication of a transformer component. Single phase and multi-phase transformer components may be provided for different electrical power distribution systems.

Regarding the fabrication of the primary and secondary coils for transformer components, copper is and has been predominately the conductive material of choice by electromagnetic component manufacturers. A great deal of different configurations of primary and secondary windings now exist that can be combined with the various different magnetic materials discussed above. Coils and windings fabricated from copper have been effectively utilized to provide adequate transformer performance in combination with a variety of magnetic materials to fabricate the magnetic core including the windings in increasingly smaller packages. Great efforts have been made in recent times, with some success, to manufacture smaller electromagnetic transformer components and/or to increase the power capabilities of transformer components that are already quite small.

However, the use of copper to fabricate the primary and secondary windings of a transformer is believed to impose a ceiling to the development of higher performing transformers and/or to provide comparable performance to existing transformers in smaller package sizes. In other words, the performance potential of copper windings and known magnetic materials is believed to have reached its peak, such that copper-based windings and coils have little more to offer in terms of providing performance improvement and reduction in size of transformer components. Because the demand for further size reduction and miniaturization of transformer components having improved performance has not subsided, a new approach is needed to further improve electromagnetic transformer performance, reduce the size of electromagnetic transformer components, and also to reduce the cost of electromagnetic transformer components.

In order to achieve increased performance while continuing to reduce the size of electromagnetic transformer components that are already quite small, the present invention proposes the use of a composite conductive material for fabricating the primary and secondary coils of the electromagnetic transformer component. In contemplated examples, the composite conductive material has a conductivity that is greater than copper to facilitate still further improvement in performance of transformers. In contemplated embodiments, the composite conductive material may include known conductive metals, or conductive metal alloys, in combination with carbon nanotubes (hereinafter CNTs). Metals such as copper, silver or other metals and alloys, for example, may be enhanced with CNTs to provide superior electrical properties to those of the metal or metal alloys alone (i.e., the metal or metal alloys without CNTs). Using CNT enhanced materials having improved conductivity, copper losses and/or core losses of transformer components may each be improved beyond the capability of conventional transformer component design. That is, transformer components utilizing the CNT enhanced materials, among other things, may operate with reduced total power loss, and hence higher efficiency, than conventionally fabricated transformers.

For example, in various exemplary embodiments the composite conductive material may include 1-99%, or even 1-100%, CNTs by weight to provide varying degrees of improved conductivity. In various contemplated embodiments, the composite conductive material including CNTs may be fabricated into flexible wire conductors that may be wound into a winding for assembly with a magnetic core piece, may be fabricated into layers of material from which conductors may be stamped and shaped into a desired geometric configuration, or may be deposited on substrate materials using known techniques. Single walled CNTs or multiple walled CNTs may be utilized and bonded to or otherwise joined with a metal or metal alloy to provide a composite material having improved conductivity relative to copper and other known metals that have been used to fabricate windings in conventional transformer fabrication. Consortiums of companies and universities have been established to develop such composite conductive materials and their manufacture.

In contemplated embodiments, a ratio of conductivity (β) of the composite conductive material including CNTs relative to that of copper may be within a range of, for example, about 1.1 to about 10.0. Such composite conductive materials are sometimes referred to as ultra-conductive materials due to their greatly increased conductivity relative to pure metals. Such ultra-conductivity is possible using such materials at room temperature, and is expressly contrasted with so-called superconductor materials that require cooling below critical temperatures in order to achieve nearly zero electrical resistance.

The use of new composite ultra-conductive materials to fabricate coils and windings in electromagnetic transformer component fabrication presents both great opportunities and great challenges to electromagnetic component manufacturers. The improved conductivity of the composite conductor materials provides much potential for improving electromagnetic performance, but the implications of its use leave much to be explored. As previously mentioned, because so much of the electromagnetic transformer component knowledge base has been built around copper-based windings, the relation between an improved conductivity of primary and secondary windings and other important attributes of the electromagnetic transformer component are not immediately clear. Thus, the implementation of ultra-conductive materials in transformer components may mean much more significant trial and error experimentation in relation to existing transformer designs, with much expense and associated delay in delivering electromagnetic transformer components that meet desired specifications.

In one aspect of the present invention, a methodology is proposed that facilitates adjusting/selecting electrical parameters associated with transformers, such as the primary winding volt-second product, the magnetizing current, maximum core magnetic field density, and total power loss based on the ratio of conductivity of a selected composite ultra-conductive material to previously used conductive materials such as copper in the fabrication of electromagnetic transformer components. Previously known transformer designs can be effectively adapted for use with ultra-conductive materials with highly reliable results that may avoid the expense and delays of experiments that may otherwise be required to implement ultra-conductive materials in electromagnetic transformer component constructions. Advantageously, the ratio of conductivity can be utilized to fabricate transformers having ultra-conductive material windings with smaller core structures, or alternatively to provide transformers of approximately the same size as existing transformers but with much greater performance capability.

In another aspect, the invention proposes identifying a range (i.e. an upper limit and lower limit), of an effective diameter of a conductor used to fabricate the primary and secondary windings of a transformer, based on the ratio of conductivity of the composite material used to fabricate the coil and an effective diameter of a similarly configured transformer having a conventional metal coil of lower conductivity such as copper. More specifically, the invention proposes to identify upper and lower limits of a ratio of an effective diameter of the improved conductivity conductor relative to a reference conductor (e.g., a copper-based conductor) in a reference transformer. Based on a range defined by the ratio of conductivity of the composite material and coil conductor diameters (or range of ratio of effective diameter of an improved conductivity conductor relative to a reference effective diameter of a reference conductor fabricated from a lower conductivity material such as copper), values of any one of the following exemplary performance parameters may be selected: the primary winding volt-second product, the magnetizing current, maximum core magnetic field density, and total power loss. When one of the parameter values is selected, the remaining ones of the parameters may be adjusted to provide a transformer with desired performance improvements. The magnetic core volume, which relates to the physical size of the completed transformer component may likewise be adjusted to vary the size of the transformer component fabrication including the ultra-conductive composite material.

In one aspect, the present invention utilizes a design approach referencing an existing or established electromagnetic transformer component having certain attributes. That is, reference may be made to a reference transformer that has a reference core fabricated from a selected magnetic material and reference primary or secondary coil fabricated form a conventional conductive metal material such as copper or copper alloy in one example. The conductivity of the copper material may be deemed a reference value of 1. Except as noted below, it is to be understood that the reference transformer and the improved transformer of the present invention have otherwise identical core shapes whether fabricated from the same or different magnetic materials as the core of the reference transformer. For instance, if the transformer of the present invention has a toroid shaped core then the reference transformer is assumed to have a toroid shaped core fabricated from the same magnetic material. For the sake of the present description, any parameter preceded by the word "reference" shall mean the corresponding parameter associated with the reference transformer, unless specified otherwise.

In accordance with some of the contemplated embodiments, the ratio of electrical conductivity (β) of composite conductive material to that of copper used in a reference conductor of copper is greater than 1. The ratio of electrical conductivity (β) defines an upper limit and lower limit of a diameter ratio (δ) of the coil conductor formed of a composite conductive material relative to a diameter of reference coil conductor formed of copper in the reference transformer.

In accordance with the embodiments of the invention, a ratio of conductivity (simply referred to as conductivity (β) in rest of the specification) of the composite material used in a transformer winding of the present invention, relative to that of copper used in reference winding affects the range of diameter of the winding or alternatively defines the range of a ratio of diameter of the conductor forming the transformer winding relative to the diameter of reference transformer's reference conductor forming the transformer winding in the reference transformer. Within this range of the effective diameter ratio (δ), the diameter of the conductors fabricated from ultra-conductive material can be selected to design and fabricate a new and improved transformer according to the present invention. For the matter of simplicity this ratio will be referred to as effective diameter ratio (δ) in the rest of description. Further, for a value of effective diameter ratio (δ) and conductivity (β) of the improved conductivity composite material, some of the parameters of the transformer, such as those described above, can be adjusted to achieve desired performance characteristics of the transformer and optimize the transformer in desired aspects. The word "adjusted," in addition to its dictionary meaning, is intended to mean selection, alteration, variation or deviation from the respective reference parameters of the reference transformer.

In accordance with the embodiments of the present invention, if the conductivity of composite material used in the transformer windings of the invention is β times that of windings made of copper used in the reference transformer, then a linear dimension ratio of a transformer according to the invention (ξ) may be within the following range defined as function of (β):

$$\beta^{-\frac{1}{8}} \leftrightarrow 1.$$

Given (ξ) as set forth above, an effective diameter ratio (δ) to construct a transformer according to the invention may be within the following range defined as function of (β) and (ξ):

$$\xi^2 \leftrightarrow \beta^{-\frac{1}{4}}$$

Within a sub-range $$\xi^2 \leftrightarrow \left(\xi^{4y}\frac{1}{\beta}\right)^{\frac{1}{2(2+y)}}$$

of the entire range $$\xi^2 \leftrightarrow \beta^{-\frac{1}{4}}$$

and at a specific value of number of turns of primary winding ($n_1$) defined by a function $\xi^2\delta^{-2}$, the primary winding volt-second product ($\lambda_1$) may be adjustable in a bounded transformer design improvement region having lower limit or boundary value of about 1 and upper limit or boundary value defined by a function $\xi^4\delta^{-2}$.

Within a sub-range $$\xi^2 \leftrightarrow \left(\xi^{4y}\frac{1}{\beta}\right)^{\frac{1}{2(2+y)}}$$

of the entire range $$\xi^2 \leftrightarrow \beta^{-\frac{1}{4}}$$

and at a specific value of number of turns of primary winding ($n_1$) defined by a function $\xi^2\delta^{-2}$, the magnetizing current ($I_{tot}$) may be adjustable in a bounded transformer design improvement region having a lower limit or boundary value defined by a function $$\xi^{-2\gamma}\beta^{\frac{1}{2}}\delta^{(2+\gamma)}$$

and an upper limit or boundary value defined by a function $$\beta^{\frac{1}{2}}\delta^2.$$

Within a sub-range $$\xi^2 \leftrightarrow \left(\xi^{4\gamma}\frac{1}{\beta}\right)^{\frac{1}{2(2+\gamma)}}$$

of the entire range $$\xi^2 \leftrightarrow \beta^{-\frac{1}{4}}$$

and at a specific value of number of turns of primary winding ($n_1$) defined by a function $\xi^2\delta^{-2}$, the maximum core magnetic field density ($B_{max}$) may be adjustable in a bounded transformer design improvement region having a lower limit or boundary value defined by a function $$(\xi^{-4\gamma}\delta^{2(\gamma)})^{\frac{1}{\gamma}}$$

and an upper limit or boundary value of about 1.

Within a sub-range $$\xi^2 \leftrightarrow \left(\xi^{4\gamma}\frac{1}{\beta}\right)^{\frac{1}{2(2+\gamma)}}$$

of the entire range $$\xi^2 \leftrightarrow \beta^{-\frac{1}{4}}$$

and at a specific value of number of turns of primary winding ($n_1$) defined by a function $\xi^2\delta^{-2}$, the total power loss ($P_{tot}$) may be adjustable in a bounded transformer design improvement region having a lower limit or boundary value defined by a function $\xi^{3-4\gamma}\delta^{2\gamma}$ and an upper limit or boundary defined by a function $\xi^3$.

It must be noted that the bounded transformer design improvement regions described above, wherein the desired values can be adjusted, are envisaged in relation to respective values of the same reference parameters of the reference transformer component. At each effective diameter ratio ($\delta$) within the range described the ratio of the number of turns in the transformer of the present invention relative to the number of turns of each winding in the reference transformer is also determined by a function $\xi\delta^{-2}$.

It is to be understood that the material constant ($\gamma$) of the magnetic material of the core of the transformer of the present invention is equal to that of the reference core of the reference transformer, and shape of the core of the transformer of the present invention is the same as the reference core of the reference transformer. A volume ratio of the volume of the core of the transformer of the present invention relative to reference volume of the reference core of the reference transformer is defined by a function $\xi^3$.

The "reference transformer" for purposes of the discussion herein is a transformer having a reference primary winding volt-second product, a reference magnetizing current, a reference maximum core magnetic field density, and a reference total power loss. The "reference transformer" also has a reference core volume including a Window Area (WA) to be occupied by a winding, a Mean Length Per Turn (MLT) for each winding, and a Cross-sectional Area (AC) of the core structure. Utilizing the design methodology and fabrication techniques herein, transformers of the invention including the higher conductivity composite material may be readily adapted to have the same or better transformer parameters and characteristics as the reference transformer.

Referring to FIG. 1, an exemplary transformer component 100 is shown that may be fabricated in accordance with an embodiment of the present invention. The transformer 100 includes a magnetic core 102 and primary and secondary windings 104*a* and 104*b*. The core 102 is formed from a material or materials having a desired magnetic permeability. More specifically, the core 102 can be fabricated from iron, iron alloys, or ferrimagnetic ceramic materials, other suitable magnetic materials, and combinations thereof. While the core is shown as a single-piece monolithic core, the core can alternatively be made and assembled different pieces to be assembled with the coils where each of the pieces can be independently fabricated into desired shapes using granular powder materials and molding techniques. Alternatively, the core 102, whether made in one piece or multiple pieces, can be fabricated by stacking multiple blocks or sheets of magnetic material that may be preformed in some embodiments.

As one example, magnetically responsive sheet materials may be provided to include soft magnetic particles dispersed in a binder material, and may be provided as freestanding thin layers or films that may be assembled in solid form, as opposed to semi-solid or liquid materials that are deposited on and supported by a substrate material. Soft magnetic powder particles may be used to make the magnetic composite sheets, including Ferrite particles, Iron (Fe) particles, Sendust (Fe—Si—Al) particles, MPP (Ni—Mo—Fe) particles, HighFlux (Ni—Fe) particles, Megaflux (Fe—Si Alloy) particles, iron-based amorphous powder particles, cobalt-based amorphous powder particles, and other suitable materials known in the art. Combinations of such magnetic powder particle materials may also be utilized if desired. The magnetic powder particles may be obtained using known methods and techniques. Optionally, the magnetic powder particles may be coated with an insulating material.

After being formed, the magnetic powder particles may be mixed and combined with a binder material. The binder material may be a polymer based resin having desirable heat flow characteristics in the layered construction of a magnetic core for higher current, higher power use of the component 100. The resin may further be thermoplastic or thermoset in nature, either of which facilitates lamination of the sheet layers provided with heat and pressure. Solvents and the like may optionally be added to facilitate the composite material processing. The composite powder particle and resin material may be formed and solidified into a definite shape and form, such as substantially planar and flexible thin sheets. Further details of pre-formed magnetic sheet layers are described in the commonly owned U.S. patent application Ser. No. 12/766,382, the entire disclosure of which is hereby incorporated by reference. Insulator sheets may be used in combination with magnetic sheets as desired, or the magnetic sheets may be joined in surface contact without any intervening layers between them.

While two windings 104*a* and 104*b* are shown in the example of FIG. 1, more than two windings may be provided. One of the windings 104*a* and 104*b* is a primary winding and the other is a secondary winding having a different number of turns to provide the desired winding ratio for operation of the transformer. It is understood, however, that additional primary and/or secondary windings may be included in additional embodiments.

In the example shown in FIG. 1, the windings 104*a* and 104*b* may be pre-formed and provided for assembly with the core 102. A physical gap (not shown in the figure) may be established in a known manner, and may be an air gap or a non-magnetic gap established with a solid material that lacks magnetic properties. Alternatively, the core structure may be fabricated using so-called distributed gap materials, such as with the pre-formed magnetic sheet layers described above, and therefore avoid any need to provide physical gaps (whether via air or non-magnetic materials) in the core structure. The core structure in the example shown generally has a volume that is a function of a Window Area (WA) to be occupied by the winding, Mean Length Per Turn (MLT) for the winding, and Cross-sectional Area (AC) of the core structure where the winding resides.

The component 100 shown in FIG. 1 may be referenced to a reference transformer of a similar configuration, but having copper-based windings 104*a* and 104*b*, and is but one example of the type of transformer component 100 that may benefit from the design approach described herein. The transformer component 100 is advantageously compact and may be assembled in a relatively simple manufacturing process to produce a miniaturized transformer component for a circuit board application. The pre-formed core 102 and the pre-formed windings 104*a* and 104*b* avoid certain manufacturing difficulties and undesirable performance fluctuation associated with winding a flexible conductor or otherwise forming windings around small core piece 102. The pre-formed windings 104*a* and 104*b* are further configured with a greater cross sectional area to handle a higher current, higher power application while still providing a small, low profile component. The configuration of the component 100 shown beneficially provides an efficient power transformer at an economical cost.

FIG. 2 shows another exemplary transformer component 120 in exploded view (FIG. 2A) and assembled view (FIG. 2B) that may be fabricated in accordance with an embodiment of the present invention. The transformer 120 includes a magnetic core in the form of a single piece 122 and primary and secondary windings 124*a*, 124*b*. The core 122 is formed from materials having a desired magnetic permeability, such as those described above. The windings 124*a* and 124*b* may be fabricated from an ultra-conductive composite material such as those described above. The shape of the transformer component 120 is seen to be different from that shown in FIG. 1. The core 122 may be gapped in a similar manner to those discussed above. The core structure in the example shown generally has a volume that is a function of a Window Area (WA) to be occupied by the winding, Mean Length Per Turn (MLT) for the winding, and Cross-sectional Area (AC) of the core structure where the winding resides.

The windings 124*a* and 124*b* in the example shown in FIG. 2 may be fabricated from a planar piece of composite, ultra-conductive material described above, and subsequently bent or otherwise shaped in the configuration shown that is sometimes referred to as a O-shaped configuration due to its resemblance in side profile. One of the windings 124*a* and 124*b* is a primary winding and the other of the windings is a secondary winding having a different number of turns to provide the desired winding ratio for operation of the transformer 120. It is understood, however, that additional primary and/or secondary windings may be included in additional embodiments.

The transformer component 120 shown in FIG. 2 may be referenced to a reference transformer of a similar configuration, but having copper-based windings 124*a* and 124*b*, and is but one example of the type of transformer component 120 that may benefit from the design approach described herein. The transformer component 120 is advantageously compact and may be assembled in a relatively simple manufacturing process to produce a miniaturized transformer component for a circuit board application. The windings 124*a* and 124*b* are further configured with a greater cross sectional area to handle a higher current application while still providing a small, low profile component. The configuration of the transformer component 120 shown beneficially provides an efficient power transformer at an economical cost. The core structure in the example shown generally has a volume that is a function of a Window Area (WA) to be occupied by the winding, Mean Length Per Turn (MLT) for the winding, and Cross-sectional Area (AC) of the core structure where the winding resides.

FIG. 3 depicts an exemplary toroidal magnetic core configuration 130 in plan view (FIG. 3A), cross sectional view (FIG. 3B) and in perspective view (FIG. 3C) that may be utilized in accordance with an exemplary embodiment of the present invention. The toroidal core 130 may be fabricated from magnetic materials such as those described above. A primary winding and one or more secondary windings made of ultra-conductive conductors such as that described above formed into wires (not shown in FIG. 3) may be wound on the surface of the toroidal core 130 in a known manner to provide a transformer component. The toroidal core 130 in the example shown generally has a volume that is a function of Window Area (WA) where the windings are applied, Mean Length Per Turn (MLT) for the windings, and Cross-sectional Area (AC). FIG. 3A shows a Window Area 132 and a Cross-sectional Area 134 is shown in FIG. 3B.

A transformer component including the toroidal core 130 shown in FIG. 3 may be referenced to a reference transformer of a similar configuration, but having copper-based windings, and is but one example of the type of transformer component that may benefit from the design approach described herein. The leads of the primary and secondary windings may be connected to terminal clips that may, in turn, be surface mounted to a circuit board. Alternatively, the leads of the primary and secondary windings formed on the core 130 may be through-hole mounted to a circuit board. In some embodiments, the primary and secondary windings formed on the core 130 need not connect to a circuit board at all, but rather may be terminated to external circuitry using known connections and techniques.

FIG. 4 depicts an exemplary EE magnetic core configuration 140 in plan view (FIG. 4A) and including first and second core pieces 142 that are identically shaped but assembled in a reverse or mirror-image arrangement with respect to one another. The core pieces 142 may be fabricated from magnetic materials such as those described above. The EE core configuration 140 is shown in cross section in FIG. 4B and the core piece 142 is shown in perspective view in FIG. 4C. The EE core configuration 140 may be utilized in accordance with an exemplary embodiment of the invention when a primary winding and one or more secondary windings made of composite, ultra-conductive wire (not shown in FIG. 4) are wound on the surface of the EE core configuration 140 in a known manner to provide a transformer component. Alternatively, pre-formed windings may be provided and assembled with the core pieces 142 to complete the transformer component. The EE core configuration 140 in the example shown generally has a volume that is a function of Window Area (WA) where the windings are applied, Mean Length Per Turn (MLT) for the windings, and Cross-sectional Area (AC). FIG. 4A shows a Window Area 144 and a Cross-sectional Area 146 associated with the windings is shown in FIG. 4B.

A transformer component including the EE core configuration 140 shown in FIG. 4 may be referenced to a reference transformer of a similar configuration, but having a copper-based windings, and is but one example of the type of transformer component that may benefit from the design approach described herein. The leads of the primary and secondary windings may be connected to terminal clips that may, in turn, be surface mounted to a circuit board. Alternatively, the leads of the primary and secondary windings formed on the core 140 may be through-hole mounted to a circuit board. In some embodiments, the primary and secondary windings formed on the core 140 need not connect to a circuit board at all, but rather may be terminated to external circuitry using known connections and techniques.

FIG. 5 depicts an exemplary magnetic ER core configuration 150 in plan view (FIG. 5A) and including first and second core pieces 152 that are identically shaped but assembled in a reverse or mirror-image arrangement with respect to one another. The core pieces 152 may be fabricated from magnetic materials such as those described above. The ER core configuration 150 is shown in cross section in FIG. 5B and the core piece 152 is shown in perspective view (FIG. 5C). The ER core configuration 150 may be utilized in accordance with an exemplary embodiment of the invention when a primary winding and one or more secondary windings made of ultra-conductive wire (not shown in FIG. 5) are wound on the surface of the ER core configuration 150 in a known manner to provide a transformer component. Alternatively, pre-formed windings may be provided and assembled with the core pieces 152 to complete the transformer component. The ER core configuration 150 in the example shown generally has a volume that is a function of Window Area (WA) where the windings are applied, Mean Length Per Turn (MLT) for the windings, and Cross-sectional Area (AC). FIG. 5A shows a Window Area 154 and a Cross-sectional Area 156 associated with the windings is shown in FIG. 5B.

A transformer component including the ER core configuration 150 shown in FIG. 5 may be referenced to a reference transformer of a similar configuration, but having copper-based windings, and is but one example of the type of component that may benefit from the design approach described herein. The leads of the primary and secondary windings may be connected to terminal clips that may, in turn, be surface mounted to a circuit board. Alternatively, the leads of the primary and secondary windings formed on the core 150 may be through-hole mounted to a circuit board. In some embodiments, the primary and secondary windings formed on the core 150 need not connect to a circuit board at all, but rather may be terminated to external circuitry using known connections and techniques.

FIG. 6 depicts an exemplary UU magnetic core configuration 150 in plan view (FIG. 6A) and including first and second core pieces 162 that are identically shaped but assembled in a reverse or mirror-image arrangement with respect to one another. The core pieces 162 may be fabricated from magnetic materials such as those described above. The UU core configuration 160 is shown in cross section in FIG. 6B and the core piece 162 is shown in perspective view (FIG. 6C). The UU core configuration 160 may be utilized in accordance with an exemplary embodiment of the invention when a primary winding and one or more secondary windings made of ultra-conductive wire (not shown in FIG. 6) is wound on the surface of the UU core configuration 160 in a known manner to provide a transformer component. Alternatively, pre-formed windings may be provided and assembled with the core pieces 162 to complete the transformer component. The UU core configuration 160 in the example shown generally has a volume that is a function of Window Area (WA) where the windings are applied, Mean Length Per Turn (MLT) for the windings, and Cross-sectional Area (AC). FIG. 6A shows a Window Area 164 and a Cross-sectional Area 166 associated with the windings is shown in FIG. 6B.

A transformer component including the UU core configuration 160 shown in FIG. 6 may be referenced to a reference transformer of a similar configuration, but having a copper-based windings, and is but one example of the type of component that may benefit from the design approach described herein. The leads of the windings may be connected to terminal clips that may, in turn, be surface mounted to a circuit board. Alternatively, the leads of the windings formed on the core 160 may be through-hole mounted to a circuit board. In some embodiments, the windings formed on the core 160 need not connect to a circuit board at all, but rather may be terminated to external circuitry using known connections and techniques.

FIG. 7 depicts an exemplary EPC magnetic core configuration 170 in plan view (FIG. 7B) and including first and second core pieces 172 that are identically shaped but assembled in a reverse or mirror-image arrangement with respect to one another. The core pieces 172 may be fabricated from magnetic materials such as those described above. The EPC core configuration 170 is shown in cross section in FIG. 7A and the core piece 172 is shown in perspective view (FIG. 7C). The EPC core configuration 170 may be utilized in accordance with an exemplary embodiment of the invention when a primary winding and one or more secondary windings made of ultra-conductive wire (not shown in FIG. 7) is wound on the surface of the EPC core configuration 170 in a known manner to provide a transformer component. Alternatively, pre-formed windings may be provided and assembled with the core pieces 172 to complete the transformer component. The EPC core configuration 170 in the example shown generally has a volume that is a function of Window Area (WA) where the windings are applied, Mean Length Per Turn (MLT) for the windings, and Cross-sectional Area (AC). FIG. 7B shows a Window Area 164 and a Cross-sectional Area 176 associated with the windings is shown in FIG. 7A.

A transformer component including the EPC core configuration 170 shown in FIG. 7 may be referenced to a reference transformer of a similar configuration, but having copper-based windings, and is but one example of the type of component that may benefit from the design approach described herein. The leads of the windings may be connected to terminal clips that may, in turn, be surface mounted to a circuit board. Alternatively, the leads of the windings formed on the core 170 may be through-hole mounted to a circuit board. In some embodiments, the windings formed on the core 170 need not connect to a circuit board at all, but rather may be terminated to external circuitry using known connections and techniques.

FIG. 8 depicts an exemplary PC magnetic core configuration 180 in plan view (FIG. 8B) and including first and second core pieces 182 that are identically shaped but assembled in a reverse or mirror-image arrangement with respect to one another. The core pieces 182 may be fabricated from magnetic materials such as those described above. The PC core configuration 180 is shown in cross section in FIG. 8A and the core piece 182 is shown in perspective view (FIG. 8C). The PC core configuration 180 may be utilized in accordance with an exemplary embodiment of the invention when a primary winding and one or more secondary windings made of ultra-conductive wire (not shown in FIG. 8) are wound on the surface of the EPC core configuration 180 in a known manner and provide a transformer component. Alternatively, pre-formed windings may be provided and assembled with the core pieces 182 to complete the transformer component. The PC core configuration 180 in the example shown generally has a volume that is a function of Window Area (WA) where the windings are applied, Mean Length Per Turn (MLT) for the windings, and Cross-sectional Area (AC). FIG. 8B shows a Window Area 184 and a Cross-sectional Area 186 associated with the windings is shown in FIG. 8A.

A transformer component including the PC core configuration 180 shown in FIG. 8 may be referenced to a reference transformer of a similar configuration, but having copper-based windings, and is but one example of the type of transformer component that may benefit from the design approach described herein. The leads of the primary and secondary windings may be connected to terminal clips that may, in turn, be surface mounted to a circuit board. Alternatively, the leads of the primary and secondary windings formed on the core 180 may be through-hole mounted to a circuit board. In some embodiments, the windings formed on the core 180 need not connect to a circuit board at all, but rather may be terminated to external circuitry using known connections and techniques.

FIG. 9 depicts an exemplary DS magnetic core configuration 190 in plan view (FIG. 9B) and including first and second core pieces 192 that are identically shaped but assembled in a reverse or mirror-image arrangement with respect to one another. The core pieces 192 may be fabricated from magnetic materials such as those described above. The DS core configuration 190 is shown in cross section in FIG. 9A and the core piece 192 is shown in perspective view (FIG. 9C). The DS core configuration 190 may be utilized in accordance with an exemplary embodiment of the invention when a primary winding and one more secondary windings made of ultra-conductive wire (not shown in FIG. 9) are wound on the surface of the EPC core configuration 190 in a known manner to provide a transformer component. Alternatively, pre-formed windings may be provided and assembled with the core pieces 192 to complete the transformer component. The DS core configuration 190 in the example shown generally has a volume that is a function of Window Area (WA) where the windings are applied, Mean Length Per Turn (MLT) for the windings, and Cross-sectional Area (AC). FIG. 9B shows a Window Area 194 and a Cross-sectional Area 196 associated with the windings is shown in FIG. 9A.

A transformer component including the DS core configuration 190 shown in FIG. 9 may be referenced to a reference transformer of a similar configuration, but having copper-based windings, and is but one example of the type of component that may benefit from the design approach described herein. The leads of the primary and secondary windings may be connected to terminal clips that may, in turn, be surface mounted to a circuit board. Alternatively, the leads of the primary and secondary windings formed on the core 190 may be through-hole mounted to a circuit board. In some embodiments, the primary and secondary windings formed on the core 190 need not connect to a circuit board at all, but rather may be terminated to external circuitry using known connections and techniques.

FIG. 10 depicts an exemplary transformer component 200 including a magnetic core in the form of an I core 202, a primary winding 204, and a secondary winding (not shown) fabricated from an ultra-conductive material such as that described above. The I core 202 may be fabricated from magnetic materials such as those described above. Primary and secondary windings made of ultra-conductive wire are wound on the surface of the I core 202 Alternatively, the primary and secondary windings may be pre-formed and provided for assembly with the I core 202 to complete the transformer component 200. The I core 202 in the example shown generally has a volume that is a function of Window Area (WA) where the windings are applied, Mean Length Per Turn (MLT) for the windings, and Cross-sectional Area (AC). FIG. 10B shows a Window Area 206 and a Cross-sectional Area 208 associated with the windings 204 is shown in FIG. 10A.

The transformer component 200 including the I core 202 may be referenced to a reference transformer of a similar configuration, but having copper-based windings, and is but one example of the type of transformer component that may benefit from the design approach described herein. The leads of the primary and secondary windings may be connected to terminal clips that may, in turn, be surface mounted to a circuit board. Alternatively, the leads of the primary and secondary windings formed on the core 202 may be through-hole mounted to a circuit board. In some embodiments, the primary and secondary windings formed on the core 202 need not connect to a circuit board at all, but rather may be terminated to external circuitry using known connections and techniques.

Figure 12:
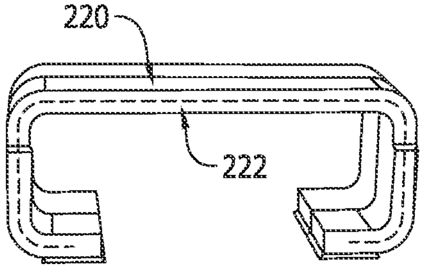
FIG. 12 is a perspective view of an exemplary winding configuration that may be utilized in an exemplary embodiment of an electromagnetic transformer component formed in accordance with an exemplary embodiment of the present invention and including an improved conductivity composite conductor material.
Figure 13:
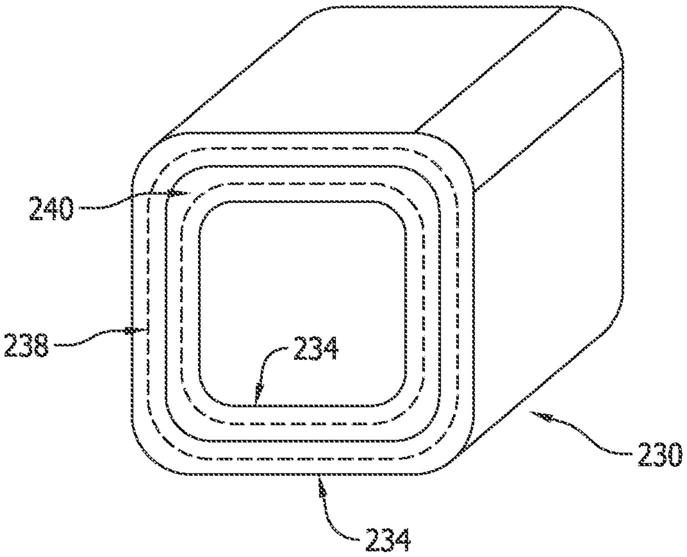
FIG. 13 is a perspective view of an exemplary winding configuration that may be utilized in an exemplary embodiment of an electromagnetic transformer component formed in accordance with an exemplary embodiment of the present invention and including an improved conductivity composite conductor material.

FIGS. 11-13 depict exemplary winding configurations an illustrating a Mean Length Per Turn (MLT) of various types of windings and winding geometries that may be utilized to construct improved transformer components including ultra-conductive materials according to the present invention. The winding geometries shown can be used in combination with one or more of the core structures discussed above or with still other core structures in various embodiments to provide transformer components according to the present invention.

FIG. 11 depicts a conductor 209 fabricated from an ultra-conductive composite material and formed into a winding 210. The winding has an exemplary Mean Length Per Turn indicated by the hyphenated line and the reference character 212. In the example shown, the winding 210 includes seven full turns. As used herein a "turn" shall refer to a portion of a conductive path defined in the winding 210 that completes one full revolution of the conductive path in a loop. In the illustrated example, each turn, sometimes referred to as a loop, has a beginning and an end and has a generally rectangular shape with rounded corners. Where one turn ends the next turn begins, and the conductive paths repeat in a continuous fashion in the winding in the multiple turn configuration illustrated. As noted above, in general the greater number of turns that are provided in the winding 210, the greater inductance value for a component including the winding 210. Likewise, the fewer number of turns provided in the winding 210, the lesser the inductance value for a component including the winding 210. While seven turns are illustrated in the example shown in FIG. 11, greater or lesser values, including fractional values (e.g., 7½ or 7.5) turns are possible.

FIG. 12 depicts a C-shaped winding 220 that is fabricated from an ultra-conductive composite material and having an exemplary Mean Length Per Turn indicated by the hyphenated line and the reference character 222. It is seen in example of FIG. 12 that the winding of the winding 220 completes less than one full turn of a winding. When windings 220 are used in a surface mount component, additional partial turns may be provided on the layout of the circuit board, such that when the winding 220 is connected to the partial turn on the circuit board, an increased number of turns is provided in one or both coils in the combination of the circuit board and a transformer component including the windings 220.

FIG. 13 depicts a multiple layer winding 230 that is fabricated from an ultra-conductive composite material. The winding 230 has a winding geometry including a first outer winding layer 232 and a second inner layer 234. The first layer 232 has an exemplary Mean Length Per Turn indicated by the hyphenated line and the reference character 236. The second layer 234 has an exemplary Mean Length Per Turn indicated by the hyphenated line and the reference character 240. Multiple turns can be provided in each of the first and second winding layers 232, 234.

It is understood that the magnetic core and winding configurations in the examples of FIGS. 1-13 are non-limiting and that still other core types and magnetic structures, and also still other winding geometries and configurations, can be utilized as desired without departing from the spirit of the invention. In some embodiments, windings may be deposited on a substrate layer and a winding pattern created on the substrate. Various patterns, shapes, or geometries of winding windings are possible including but not limited to spiral and serpentine winding shapes.

In all of the embodiments described above, the windings are fabricated from an ultra-conductive composite material. The composite conductive material utilized may contain 1-99% by weight, or even 100% by weight, of carbon nanotubes (CNTs) along with metal or metal alloys, such as copper, copper alloys, aluminum, or aluminum alloys. The ultra-conductive conductor including the CNTs may include a metal or metal alloy core, and carbon nanotube (CNT) cladding, that is shaped into any of the winding configurations described above and/or assembled with any of the core structures described above. In contemplated embodiments, the conductivity of the composite material may be about 1.1 to about 10 times that of copper. The ultra-conductive material used to fabricate the windings can be made using any suitable process.

Figure 14:
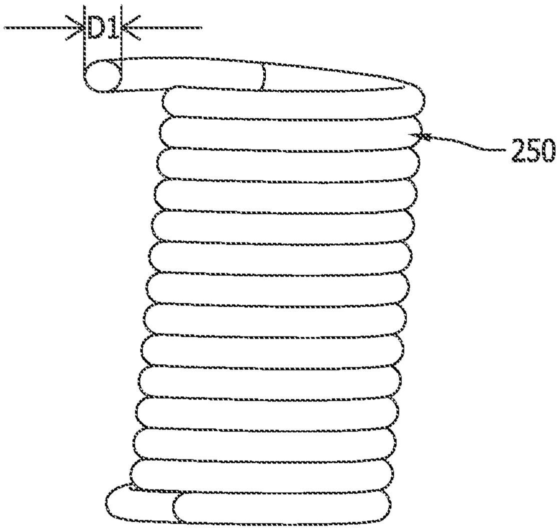
FIG. 14 is a perspective view of an exemplary winding configuration that may be utilized in an exemplary embodiment of an electromagnetic transformer component formed in accordance with an exemplary embodiment of the present invention and including an improved conductivity composite conductor material.

Referring to FIG. 14, there is shown a winding 250 fabricated from a composite ultra-conductive conductor material and wound for a number of turns to complete a winding. As seen in FIG. 14 at one end of the winding 250, the conductor has a round or circular cross section including a diameter D1. The diameter D1 of the round wire may vary in different embodiments, and the cross sectional area of the conductor likewise varies with the selected diameter D1. As mentioned above, the cross sectional area of the winding, in part, determines the inductance value of a component including the winding 250.

Figure 15:
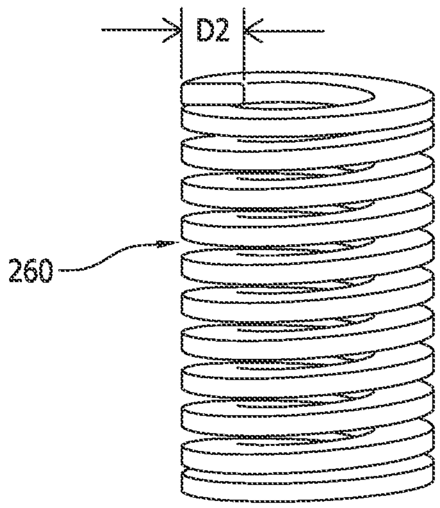
FIG. 15 is a perspective view of an exemplary winding configuration that may be utilized in an exemplary embodiment of an electromagnetic transformer component formed in accordance with an exemplary embodiment of the present invention and including an improved conductivity composite conductor material.

FIG. 15 illustrates a winding 260 also fabricated from a composite ultra-conductive conductor material and wound for a number of turns to complete a winding. As seen in FIG. 15 at one end of the winding 260, the conductor has a rectangular cross section including a major dimension D2. The conductor shown in the winding 260 is sometimes referred to as a flat wire winding, whereas the conductor shown in the winding 250 (FIG. 14) is referred to as a round wire winding. The dimension D2 of the flat wire may vary in different embodiments, and the cross sectional area of the conductor likewise varies with the selected dimension D2. As mentioned above, the cross sectional area of the winding, in part, determines the inductance value of a component including the winding 260.

If a winding wire has a cross-sectional shape other than round, as shown in the example of FIG. 15, its effective "diameter" for purposes of the present invention shall be deemed to be the diameter of a round wire with equivalent cross-sectional area. As one example, if the major dimension D2 has a value (e.g., 6 in a unit length) in a given embodiment, and the minor dimension measured in a direction perpendicular to the major dimension D2 in FIG. 15 has a value (e.g., 2 in the same unit length), the cross sectional area of the conductor is the product of these two values or 12 square units. A diameter of a circular cross section having the same 12 square units in cross sectional area can be computed by first finding the radius of a circular cross section using the following relationship for a circular cross section:

$$A=\pi r^2$$

where the diameter D of the circular cross section is equal to twice the radius R. In this example where A is 12 square units, the radius r can be computed and is seen to be 1.95. The diameter of a round cross section having the area of 12 is therefore twice the radius (e.g., 1.95×2) or 3.9. The conductor shown in FIG. 15 having a rectangular cross sectional area of 12 square therefore has an "effective diameter" of 3.9 for purposes of the present invention.

Figure 16:
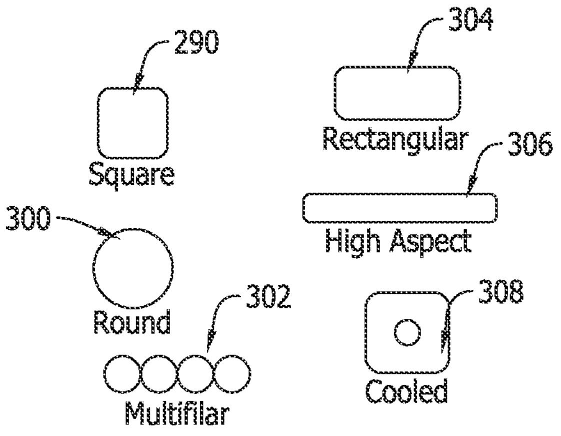
FIG. 16 illustrates a number of exemplary alternative cross sections of conductors that may be utilized to fabricate windings in an exemplary embodiment of an electromagnetic transformer component formed in accordance with an exemplary embodiment of the present invention and including an improved conductivity composite conductor material.

FIG. 16 shows additional cross sectional areas of ultra-conductive composite conductor materials that may be utilized to fabricate windings in electromagnetic transformer components according to the present invention. In the examples shown in FIG. 16, the cross sections may be square as shown in the example conductor 290, round or circular as shown in the example conductor 300, multifilar as shown in the example conductor 302, rectangular as shown in the example conductor 304, a high aspect ratio cross section as shown in the example conductor 306, and a cooled cross section as shown in the example conductor 290. For each of these cross sections of conductors, an "effective diameter" can be computed in a similar manner to the example above. In the case of a round cross section such as in the conductor 300, the effective diameter is equal to the actual diameter of the round conductor.

Of course, the exemplary conductors and cross sections illustrated in FIG. 16 are exemplary only. Other conductors and cross sectional configurations are possible to construct windings for electromagnet components in further and/or alternative embodiments of the invention. Windings may fabricated from such conductors to include any number of turns and/or arrangement of turns layers. In multiple turn embodiments, a plurality of turns may be arranged concentrically with or without insulation in between. A plurality of windings may further be provided and may be electrically connected in series or in parallel. A plurality of windings may be arranged in a flux sharing relationship so that the windings are mutually coupled, or a plurality of uncoupled windings may be independently operable but nonetheless coupled to a common magnetic core structure.

Figure 17:
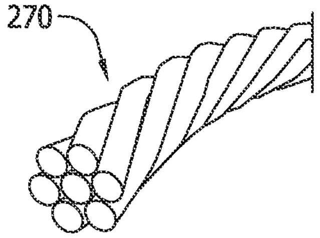
FIG. 17 illustrates an exemplary conductor that may be utilized to fabricate windings in an exemplary embodiment of an electromagnetic transformer component formed in accordance with an exemplary embodiment of the present invention and including an improved conductivity composite conductor material.

FIG. 17 illustrates a conductor 270 that may be fabricated from ultra-conductive composite materials and wherein multiple conductor strands are combined and twisted about one another to form a larger conductor 270. The conductor 270 may be provided as a length of wire that in turn may be wound for a number of turns to complete a winding having a mean length per turn (MLT) as discussed above. The example conductor 270 shown in FIG. 17 may be recognized as a Litz wire or magnet wire, and the cross sectional area of the conductor 270 is equal to the sum of the cross sectional areas of the conductor strands. As such, in the illustrated example, seven conductor strands are utilized having the same circular cross sectional area, so the cross sectional area of the entire conductor is seven times the cross sectional area of the strands utilized. The effective diameter of the conductor for the purposes of the invention is then the diameter of a solid round wire with equivalent cross-sectional area of the conductor 270.

For example, if each strand has a cross sectional area of 2 square units and seven strands are utilized as shown, the conductor 270 has a cross sectional area of 14. Using the relationship above, the radius r of a circle having an area of 14 square units can be computed. In this example, the radius r is 2.11 and the diameter is therefore twice the radius (e.g., 2.11×2) or 4.22. The conductor shown in FIG. 17 having a cross sectional are of 14 square units therefore has an "effective diameter" of 4.22 for purposes of the present invention.

Figure 18:
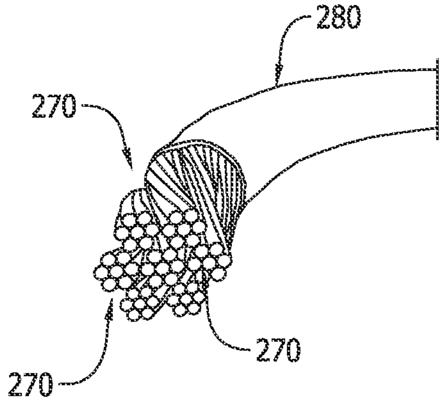
FIG. 18 illustrates an exemplary conductor that may be utilized to fabricate windings in an exemplary embodiment of an electromagnetic transformer component formed in accordance with an exemplary embodiment of the present invention and including an improved conductivity composite conductor material.

FIG. 18 illustrates a conductor 280 that may be fabricated from ultra-conductive composite materials and wherein multiple conductor strands are combined and twisted about one another to form a larger conductor 280. The conductor 280 may in turn be wound for a number of turns to complete a winding having a mean length per turn (MLT) as discussed above. The example conductor 280 shown in FIG. 18 may be recognized as a combination of conductors such as that shown in FIG. 17, and the cross sectional area of the conductor 280 is equal to the sum of the cross sectional areas of the conductors 270. As such, in the illustrated example, seven conductors 270 are utilized to fabricate the conductor 280.

Continuing the example above, if each conductor 270 has a cross sectional area of 14 square units (2 square units per strand times seven strands), the cross sectional area of the entire conductor 280 is seven times the cross sectional area of the conductor strands (e.g., 7 times 14 or 98 square units). The effective diameter of the conductor for the purposes of the invention is then the diameter of a solid round wire with equivalent cross-sectional area of the conductor 280. Using the relationship above, the radius r of a circle having an area of 98 square units can be computed. In this example, the radius is 5.59 and the diameter is therefore twice the radius (e.g., 5.59×2) or 11.18. The conductor 280 shown in FIG. 18 having a cross sectional area of 98 square units therefore has an "effective diameter" of 11.18 for purposes of the present invention.

It must be understood that the above examples are non-limiting and other core types can also be used in exemplary embodiments of transformers without departing from the spirit of the invention.

Regardless of which particular type of transformer is desired, including but not limited to the exemplary transformer types described above, electrical efficiency of the transformer is an important consideration to transformer designers and manufacturers. Optimizing efficiency, which correlates to reducing or minimizing power loss of the transformer in use, is of increasing concern to the transformer industry because as transformers are increasingly used in higher power, higher current circuitry, inefficiency in the transformer construction has a more pronounced effect on the circuit. Also, as many portable electronic devices include onboard battery power supplies, power losses attributable to transformers can contribute to a reduced battery life between re-charge events.

As appreciated by those in the art, the core losses in a transformer are in the form of eddy current and hysteresis losses which occur due to the core or in other words are dependent on the material used for making the core. Core loss at a fixed frequency is given by the following equation:

$$P_{fe}=K_{fe}B_{max}{}^{\gamma}A_c l_m$$

where $K_{fe}$ is a constant of proportionality which depends on the operating frequency, $B_{max}$ is the magnetic core's peak flux density, $A_c$ is the cross-sectional area of core, and $l_m$ is the mean magnetic path length in the core. The product $A_c*l_m$ corresponds to the volume of the core.

The copper losses in a transformer are mainly in the form of the heat produced in the windings of the transformer due to the flow of current through the conductors in each of the windings. The power dissipation through copper loss in a winding of a transformer is given by the following equation.

$$P=I^2R$$

Considering that a transformer necessarily includes more than one winding, the relationship above is duplicated for each winding present. In view of this, the equation above can be seen as follows wherein J represents windings numbered 1 through n.

$$P_{cu,j}=I_j^2R_j \text{ (for Jth winding)}$$

Reference is made to an exemplary text book "Fundamentals of Power Electronics" by Prof. R. W. Erickson and Prof. Dragan Maksimovie from University of Colorado, Boulder to the known and applicable transformer design equations.

In the equation for power dissipation through copper losses in the Jth winding set forth above, the values of resistance R of winding J may be substituted as per the formulae $$R_j=\rho\frac{l_j}{A_{wj}}$$

where ρ is winding wire effective resistivity, $A_{wj}$ is Wire Cross-sectional Area of the Jth winding, and $l_j$ is length of the Jth winding. The length of wire of the Jth winding is given by $l_j=n_j$ (MLT) where $n_j$ is number of turns of the Jth winding and MLT is mean length per turn. J=1 refers to the primary winding and J=2, 3, 4 . . . n refers to multiple secondary windings of a number n. A transformer necessarily has at least one secondary winding, J=2, but as noted above may have more than one secondary winding. A single value of MLT is applied to all windings without major loss in numerical precision in the transformer design equations.

Further, the wire cross-sectional area transformer of the Jth winding is given by the following relationship:

$$A_{wj} = \frac{W_A K_u \alpha_j}{n_j}$$

where $W_A$ is window area of the core, $K_u$ is fill factor of the core considering all of the windings together and $\alpha_j$ is the allocation factor of the Jth winding within the window area of the core. As previously mentioned, $n_j$ is the number of turns of the Jth winding.

Based on the above equations and substitutions, the copper loss of the Jth winding can be re-written as the following relationship:

$$P_{cu,j} = \frac{n_j^2 i_j^2 \rho(MLT)}{W_A K_u \alpha_j}$$

The total copper loss of the transformer can likewise be written in the following form:

$$P_{cu,tot} = \frac{\rho(MLT)}{W_A K_u}\left(\sum_{j=1}^{k} n_j I_j\right)^2$$

where value of $\alpha_j$ is substituted based from the following equations resulting from the minimization of copper losses.

$$\alpha_m = \frac{n_m I_m}{\sum_{n=1}^{\infty} n_j I_j}$$

$$\alpha_m = \frac{V_m I_m}{\sum_{n=1}^{\infty} V_j I_j}$$

Further, a flux density in a transformer is related to the applied primary winding voltage according to Faraday's Law. Denote the volt-seconds applied to the primary winding during the positive portion of $v_1$ (t) as $\lambda_1$.

$$\lambda_1 = \int_{t1}^{t2} v_1(t)dt$$

The above equation causes the flux to change from its negative peak to its positive peak. From Faraday's law, the peak value of the AC component of the flux density is:

$$B_{max} = \frac{\lambda_1}{2 n_1 A_c}$$

Based on the above equation, to attain a given flux density of a transformer, the number of turns in the primary windings may be determined according to the following relationship:

$$n_1 = \frac{\lambda_1}{2 B_{max} A_c}$$

Further, a total magnetizing current of a transformer is given by the following equation for a transformer with up to k windings $$I_{tot} = \sum_{j=1}^{k} \frac{n_j}{n_1} I_j$$

The total power loss due to copper in a transformer can be re-written as follows:

$$P_{cu} = \frac{\rho(MLT) n_1^2 I_{tot}^2}{W_A K_u}$$

where $$I_{tot} = \sum_{j=1}^{k} \frac{n_j}{n_1} I_j$$

is the sum of the R.M.S winding currents, refer to winding 1.

Eliminating $n_1$ using result of the previous equation, the following relationship is seen:

$$P_{cu} = \left(\frac{\rho \lambda_1^2 I_{tot}^2}{K_u}\right)\left(\frac{(MLT)}{W_A A_c^2}\right)\left(\frac{1}{B_{max}^2}\right)$$

where $$\lambda_1 = \int_{t1}^{t2} v_1(t)\,dt$$

and where $$B_{max} = \left[\frac{\rho \lambda_1^2 I_{tot}^2 (MLT)}{2 K_u W_A A_c^3 l_m \gamma K_{fe}}\right]^{\frac{1}{\gamma+2}}$$

which is the value of the optimum $B_{max}$ that minimizes total power losses, both copper and core losses.

Substituting the optimum $B_{max}$ into the expression for $P_{cu}$ and $P_{fe}$ to obtain total power dissipation or loss $P_{tot}$ in a transformer.

$$P_{tot} = P_{cu} + P_{fe}$$

or $$P_{tot} = [A_c^2 l_m K_{fe}]^{\frac{2}{\gamma+2}}\left[\frac{\rho \lambda_1^2 I_{tot}^2}{4K_u}\frac{(MLT)}{W_A A_c^2 l_m}\right]^{\frac{\gamma}{\gamma+2}}\left[\left(\frac{\gamma}{2}\right)^{\frac{\gamma}{\gamma+2}} + \left(\frac{\gamma}{2}\right)^{\frac{2}{\gamma+2}}\right]$$

It is apparent from the above equations that while designing any transformer, the parameters such as total power dissipation (or total power loss) $P_{tot}$, peak magnetizing current $I_{tot}$, primary winding volt second product $\lambda_1$ and the number of turns of the primary winding $n_1$ are the important functional parameters that have major effect on the final design.

As mentioned above, the implications of constructing a transformer using primary and secondary windings fabricated from improved conductivity materials such as those described above are not immediately clear. That is, exactly how the windings fabricated from improved conductivity affects the total power dissipation (or total power loss) $P_{tot}$, peak magnetizing current $I_{tot}$, primary winding volt second product $\lambda_1$, and the number of turns of the primary winding $n_1$ is, to put it mildly, hardly straightforward. If conventional transformer design and fabrication techniques were applied, much custom design effort and iteration of experimental fabrication and testing would follow as the implications and consequences of utilizing the improved conductivity matters are in some aspects practically unpredictable. The transformer design and fabrication techniques of the invention, however, eliminate such difficulties and facilitate a conversion of existing transformer designs and manufactures to new and improved transformer components with predictable results.

Accordingly, in contemplated embodiments of the invention, the transformer design and fabrication of the invention is based upon an existing transformer design and manufacture, referred to herein as a reference transformer. The reference transformer has a core shape that can be the basis for a new and improved, optimized transformer design and manufacture according to the invention.

For a constant shape magnetic core (i.e., a core having the same shape as the core in the reference transformer), points or values within a transformer design improvement region or regions, as further described below, may be defined and bounded by boundary equations that may be derived from the following equation set where the meaning of $n_1$, Itot, λ1, $B_{max}$, and Ptot has been changed to mean the ratio of the improved transformer parameter to that of the reference transformer parameter.

$$n_1 = \xi^2\delta^{-2}$$

$$B_{max} = \left(\frac{1}{\beta}\delta^{-4}Itot^2\right)^{\frac{1}{\gamma}}$$

$$\lambda 1 = \left(\xi^{4\gamma}\frac{1}{\beta}\delta^{-2(2+\gamma)}Itot^2\right)^{\frac{1}{\gamma}}$$

$$Ptot = \xi^3\frac{1}{\beta}\delta^{-4}Itot^2$$

where (ξ) is within a range defined as function of (β), namely a range of $$\beta^{-\frac{1}{8}} \leftrightarrow 1$$

and wherein $$\xi^2 \geq \delta \geq \beta^{-\frac{1}{4}}$$

are the upper and lower limits of δ that improvements to $B_{max}$, $I_{tot}$, $\lambda_1$, and $P_{tot}$ can be effected for transformer components according to the present invention.

In order to obtain improvements, relative to the reference transformer, in one or more of the basic functional transformer parameters and optimum values of basic functional transformer parameters, the design and fabrication approach of the present invention proposes use of primary and secondary windings made of an improved, higher conductivity composite material instead of conventional windings made of copper. The composite material has direct impact on the effective diameter of the primary and secondary windings and their number of turns, which in turn affect almost all other basic functional parameters of the transformer.

In accordance with the present invention, the improved, higher conductivity composite material may contain 1-99% by weight carbon nanotube along with metal or metal alloys, such as copper, copper alloys, aluminum, or aluminum alloys. Sometimes the composite material made of copper and carbon nanotube is also referred to as "Ultra Conductive Copper". The primary and second windings, fabricated from such high conductivity composite material, may include a metal or metal alloy core, and carbon nanotube cladding. In accordance with contemplated embodiments of the present invention, the conductivity of the composite material may be, for example, 1.1-10 times that of copper, which is due to ballistic transport properties of the carbon nanotubes. The primary and secondary windings can be made using any suitable process and provided for use to construct improved transformers of the present invention.

In accordance with exemplary embodiments of transformers according to the present invention, an effective diameter of the winding(s) is mainly dependent on the conductivity of the composite material and other parameters and can offer significant improvements in the winding wire diameter, which in turns, advantageously provides an overall size reduction of the completed transformer component.

In one aspect, the present invention utilizes a design approach referencing an existing or established electromagnetic transformer component having certain attributes. That is, reference may be made to a reference transformer that has a reference core fabricated from a selected magnetic material and a reference coil fabricated form a conventional conductive metal material such as copper or copper alloy in one example. The conductivity of the copper material utilized to fabricate conventional transformer windings may be deemed a reference value of 1. Except as noted below, it is to be understood that the reference transformer and the improved transformer of the present invention have otherwise identical core shapes whether fabricated from the same or different magnetic materials as the core of the reference transformer. For instance, if the transformer of the present invention has a toroid shaped core then the reference transformer is assumed to have a toroid shaped core fabricated from the same magnetic material. For the sake of the present description, any parameter preceded by the word "reference" shall mean the corresponding parameter associated with the reference transformer, unless specified otherwise.

In accordance with the embodiments of the present invention, a ratio of conductivity (simply referred to as conductivity (β) in rest of the specification) of the composite material used in a transformer winding (e.g., the windings 104*a* and 104*b* shown in the FIG. 1 or the windings in the other embodiments described herein), relative to that of copper used in the reference winding affects the range of diameter of the transformer winding(s) or alternatively defines the range of a ratio of diameter of the conductor formed into the winding of the transformer according to the invention relative to the diameter of the conductor in the reference transformer formed into the windings of the reference transformer. Within this range of the effective diameter ratio (δ), the diameter of the improved higher conductivity conductors for a transformer according to the invention can be selected. For the matter of simplicity this ratio is referred to herein as an "effective diameter ratio" (δ) in the rest of description. Further, for a value of effective diameter ratio (δ) and conductivity (β) of composite material, some of the parameters of the reference transformer, such as magnetizing current and maximum flux density can be adjusted to achieve and improved and optimized transformer of the present invention. The word "adjusted," in addition to its dictionary meaning, is used herein to mean selection, alteration, variation or deviation from the respective reference parameters of the reference transformer.

In accordance with exemplary embodiments of the present invention, if the conductivity of composite material used in the transformer windings of the present invention is β times that of windings made of copper used in then reference transformer, then the effective diameter ratio (β) may be within a range of $$\xi^2 \leftrightarrow \beta^{-\frac{1}{4}}$$

and the linear dimension ratio (ξ) can be within a range $$\beta^{-\frac{1}{8}} \leftrightarrow 1.$$

Within a sub-range $$\xi^2 \leftrightarrow \left(\xi^{4\gamma}\frac{1}{\beta}\right)^{\frac{1}{2(2+\gamma)}}$$

of the entire range $$\xi^2 \leftrightarrow \beta^{-\frac{1}{4}}$$

and at a specific value of number of turns of primary winding ($n_1$) defined by $\xi^2\delta^{-2}$, the primary winding volt-second product ($\lambda_1$) is adjustable in a bounded region having lower limit about 1 and upper limit defined by a function $\xi^4\delta^{-2}$. The magnetizing current ($I_{tot}$) is adjustable in a bounded region having lower limit defined by a function $$\xi^{-2\gamma}\beta^{\frac{1}{2}}\delta^{(2+\gamma)}$$

and upper limit defined by a function $$\beta^{\frac{1}{2}}\delta^2.$$

The maximum core magnetic field density ($B_{max}$) is adjustable in a bounded region having lower limit defined by a function $$(\xi^{-4\gamma}\delta^{2(\gamma)})^{\frac{1}{\gamma}}$$

and upper limit about 1. The total power loss ($P_{tot}$) is adjustable in a bounded region having lower limit defined by a function $\xi^{3-4\gamma}\delta^{2\gamma}$ and upper limit defined by a function $\xi^3$. It must be noted that the regions of improvement, wherein the desired values can be adjusted, are envisaged in relation to respective values of the same reference parameters. At each effective diameter ratio (δ) within the range the ratio of the number of turns relative to the number of turns of each transformer winding in the reference transformer is determined by the function $\xi\delta^{-2}$.

It is to be understood that the material constant (γ) of the magnetic material of the transformer core of the invention is equal to that of the reference core of the reference transformer, and shape of the transformer core of the present invention is the same as a reference core of the reference transformer and a volume ratio of the volume of the transformer core of the present invention relative to a reference volume of the reference core of the reference transformer is defined by a function $\xi^3$.

Figure 19:
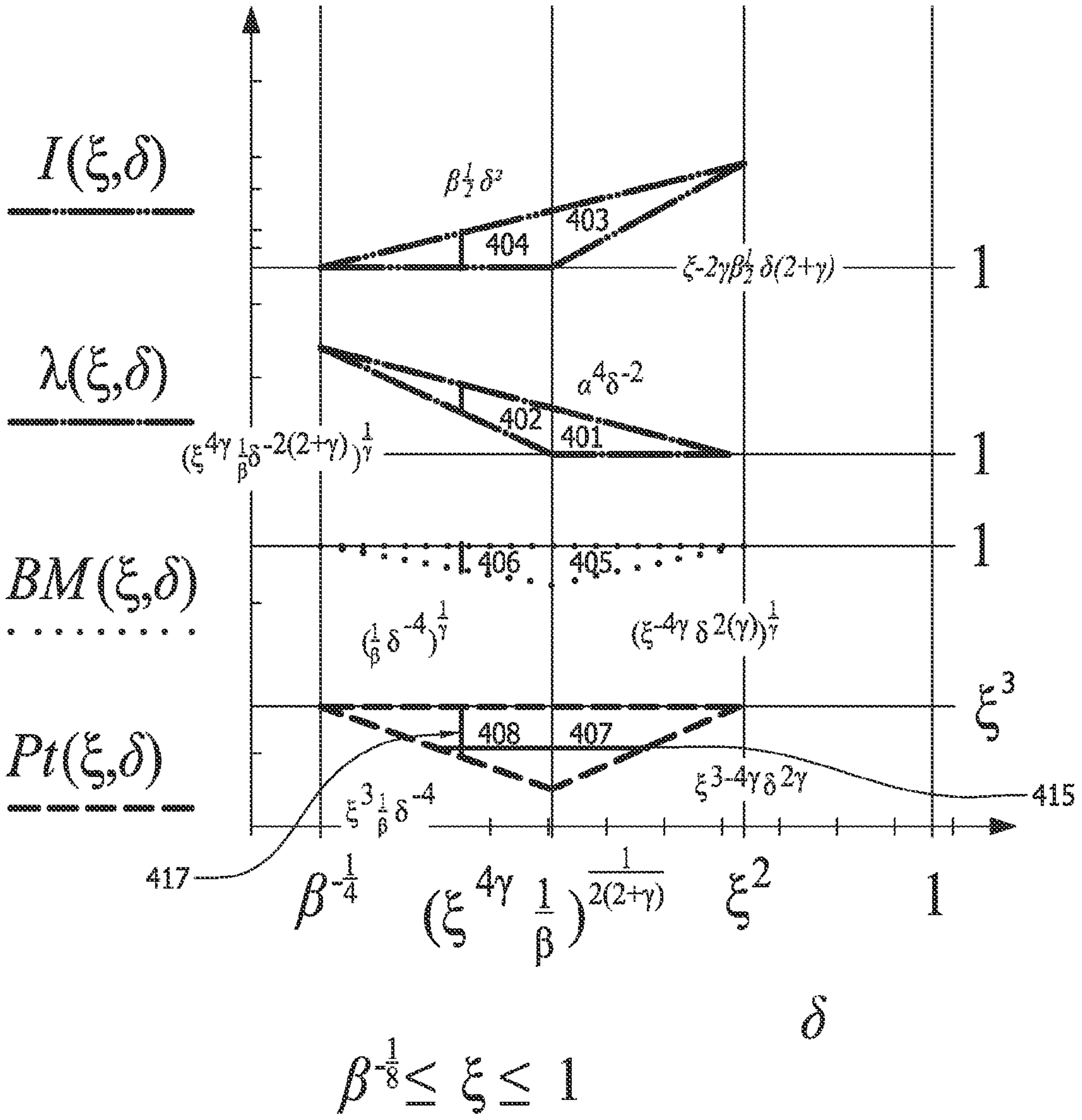
FIG. 19 is an exemplary transformer design improvement region graph showing optimal bounded regions of performance improvement for an exemplary embodiment of an electromagnetic transformer component formed in accordance with an exemplary embodiment of the present invention and including an improved conductivity composite conductor material.

The limits and functions referred to above are derived from relationships such as those described above and are illustrated in graphical form in FIG. 19. In FIG. 19, the effective diameter ratio (δ) is plotted along the x-axis. Since the conductivity ratio (β) and linear dimension ratio (ξ) relates to the effective diameter ratio (δ), the values of the effective diameter ratio (δ) are shown in reference to a function of the conductivity ratio (β) and linear dimension ratio (ξ). Exemplary transformer component parameters are plotted along the y-axis as functions of the effective diameter ratio (δ) and linear dimension ratio (ξ).

FIG. 19 shows a number of exemplary bounded regions of performance improvements of a transformer according to the present invention relative to the reference transformer for a range of effective diameter ratios (δ) within a sub-range $$\xi^2 \leftrightarrow \left(\xi^{4\gamma}\frac{1}{\beta}\right)^{\frac{1}{2(2+\gamma)}}$$

of the entire range $$\xi^2 \leftrightarrow \beta^{-\frac{1}{4}}.$$

More specifically, FIG. 19 shows an exemplary bounded region of performance improvement of the primary winding volt-second product ($\lambda_1$) represented by reference numeral 401, an exemplary bounded region of performance improvement of the magnetizing current ($I_{tot}$) represented by reference numeral 403, an exemplary bounded region of performance improvement of the maximum core magnetic field density ($B_{max}$) represented by reference numeral 405, and an exemplary bounded region of performance improvement the total power loss ($P_{tot}$) represented by reference numeral 407.

FIG. 19 also shows a number of exemplary bounded regions of performance improvements of a transformer according to the present invention relative to the reference transformer for a range of effective diameter ratios (δ) within a sub-range $$\left(\xi^{4\gamma}\frac{1}{\beta}\right)^{\frac{1}{2(2+\gamma)}} \text{ to } \beta^{-\frac{1}{4}}$$

of the entire range $$\xi^2 \leftrightarrow \beta^{-\frac{1}{4}}$$

and at a specific value of number of turns of primary winding ($n_1$) defined by $\xi^2\delta^{-2}$. In this sub-range, the primary winding volt-second product ($\lambda_1$) is adjustable in a bounded improvement region 402 having lower limit defined by a function $$\left(\xi^{4\gamma}\frac{1}{\beta}\delta^{-2(2+\gamma)}\right)^{\frac{1}{\gamma}}$$

and an upper limit defined by a function $\xi^4\delta^{-2}$. The magnetizing current ($I_{tot}$) is adjustable in an improvement region 404 having lower limit about 1 and upper limit defined by a function $$\beta^{\frac{1}{2}}\delta^2.$$

The maximum core magnetic field density ($B_{max}$) is adjustable in a bounded improvement region 406 having lower limit defined by a function $$\left(\frac{1}{\beta}\delta^{-4}\right)^{\frac{1}{\gamma}}$$

and upper limit about 1. The total power loss (Ptot) is adjustable in a bounded improvement region 408 having lower limit defined by a function $$\xi^3\frac{1}{\beta}\delta^{-4}$$

and an upper limit defined by a function $\xi^3$. At each effective diameter ratio (δ) within the range the ratio of the number of turns relative to the number of turns of each transformer winding in the reference transformer is determined by the function $\xi\delta^{-2}$.

The improvement regions 401, 402, 403, 404, 405, 406, 407 and 408 shown in FIG. 19 are defined and shown to be bounded by broken lines represented by the values and functions described above and shown in FIG. 19. The boundary lines, corresponding to the values and functions described and shown for each improvement region 401, 402, 403, 404, 405, 406, 407 and 408 define the bounded regions such that any value between and including the boundary lines may be utilized to design and fabricate a transformer according to the present invention that will be improved, or optimized, relative to the reference transformer in at least one aspect. A desired value of diameter ratio (δ) for a transformer component of the present invention can be any value within these boundaries to provide a transformer component having improved parameters or characteristics relative to the reference transformer.

However, if the diameter ratio (δ) is selected to be outside the limits of the bounded regions 401, 402, 403, 404, 405, 406, 407 and 408 shown (i.e., outside the broken boundary line values corresponding to the functions and values described and shown for each region), the resultant transformer component including the improved higher conductivity composite material will be less desirable than the corresponding value of the reference transformer in at least one aspect. As one example, a transformer component may be constructed using the improved higher conductivity material to fabricate its windings that actually performs with higher power losses than the reference transformer using certain diameter ratios (δ) that are outside the regions 407 and 408. That a higher conductivity composite material may be utilized to provide a transformer with higher power losses than the reference transformer utilizing a conventional conductive material having a lower conductivity (but otherwise similar design) is perhaps a counterintuitive result that is preferably avoided. Thus, the bounded regions shown provide a range of values, within and including the boundaries shown in which the corresponding values of a transformer component of the present invention constructed with values (β) and (δ) is the same or better in terms than the corresponding values of the reference transformer.

In accordance with certain contemplated embodiments of the invention, it is possible to confine a reduction in size of the transformers that would occur as a result of use of the composite material winding, to the height of the transformer. In accordance with the embodiments described above, it is assumed that when the core volume (V) is improved (i.e., reduced) such improvement happens proportionally for all the sides or dimensions of the core structure (i.e., all the dimensions of the magnetic core structure shrink proportionally relative to the reference core while the core structure shape and contour remains the same).

Figure 20:
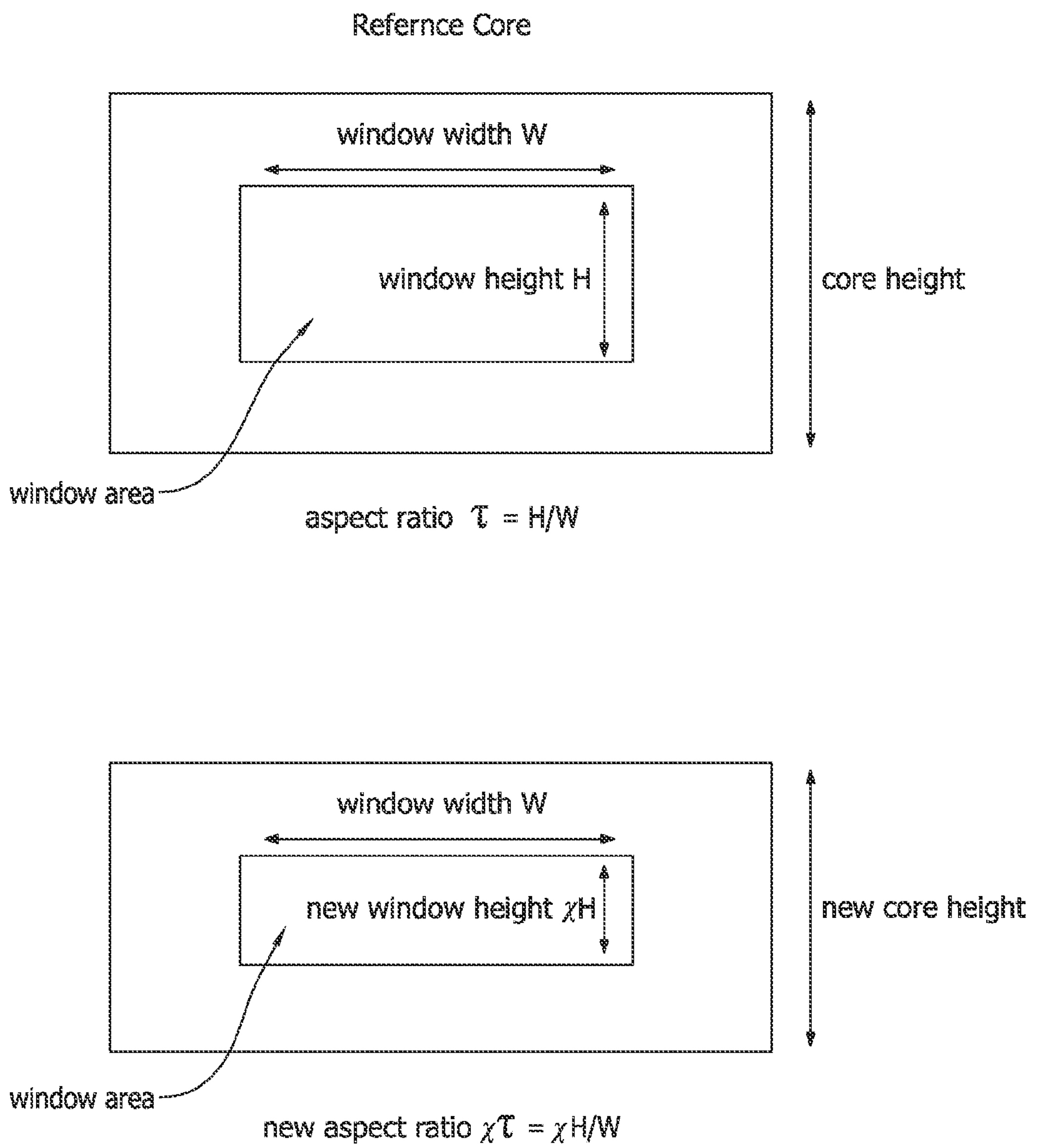
FIG. 20 is a comparison diagram showing a magnetic core of a reference transformer component and a corresponding reduction in magnetic core height of an electromagnetic transformer component formed in accordance with an exemplary embodiment of the present invention and including an improved conductivity composite conductor material.

FIG. 20 shows an exemplary embodiment when only the height of the transformer of the invention, relative to the reference transformer, is reduced. In this case all the dimensions of the core would not reduce proportionally based on linear dimension ratio (ξ) and only the height of the core 102 reduces based on core height ratio (χ). Also when only one dimension of the core (i.e. height) is reduced, the aspect ratio of window area (τ) (defined as the height dimension H divided by the width dimension W or H/W), along with other factors, affects the magnetizing current ($I_{tot}$), maximum core magnetic field density ($B_{max}$), and total power loss ($P_{tot}$).

Figure 21:
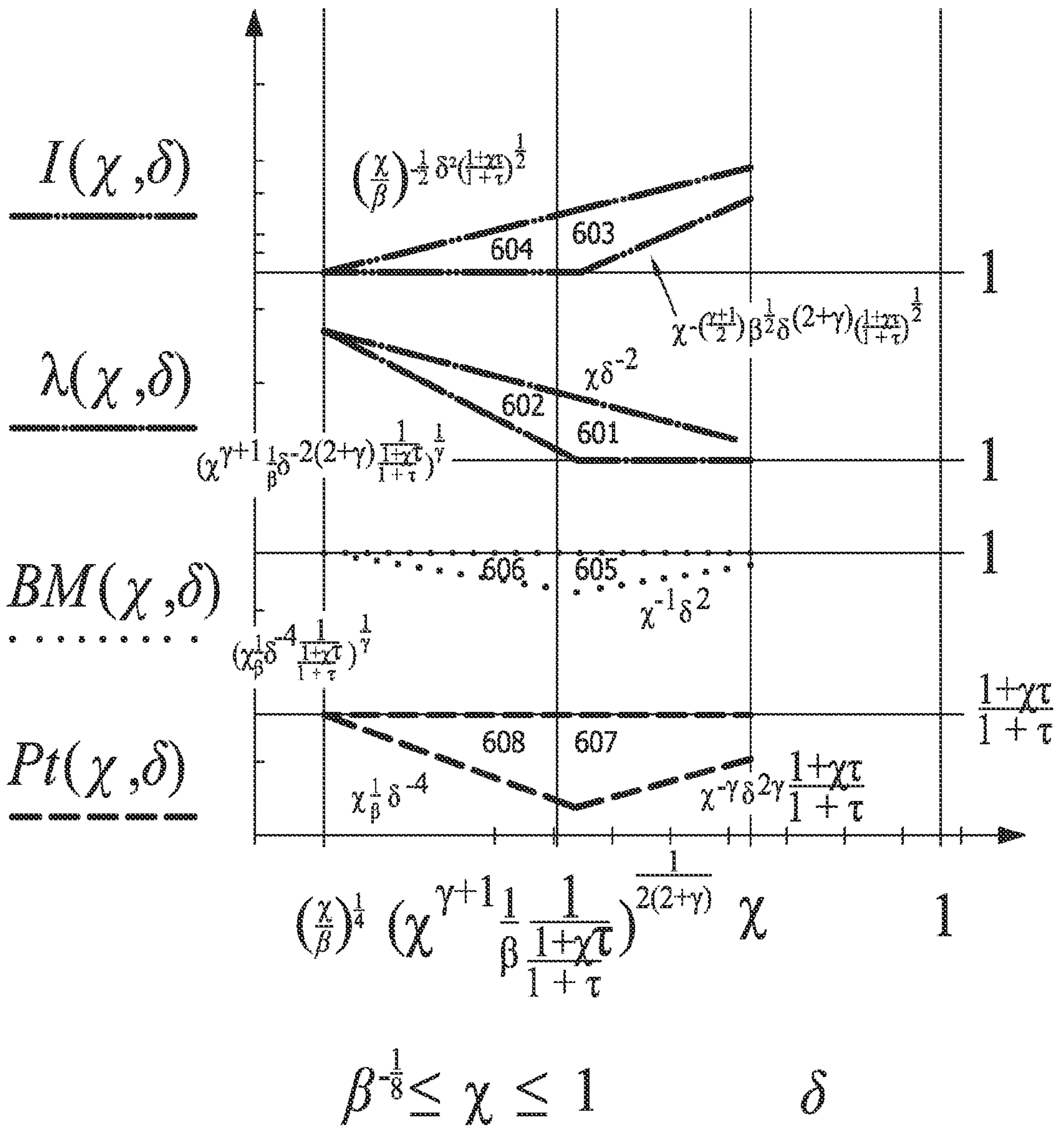
FIG. 21 is another exemplary transformer design improvement region graph showing optimal bounded regions of performance for an exemplary embodiment of an electromagnetic transformer component formed in accordance with an exemplary embodiment of the invention and including an improved conductivity composite conductor material.

In accordance aspects of the present invention, and as shown in FIG. 21, in case when only the transformer (core) height changes as shown in FIG. 20 and the effective diameter ratio (δ) can be within a range of $$\chi \leftrightarrow \left(\frac{\chi}{\beta}\right)^{\frac{1}{4}}$$

and the core height ratio (χ) can be within a range $$\beta^{-\frac{1}{3}} \leftrightarrow 1.$$

Within a sub-range of the effective diameter ratio from $\chi$ to $$\left(\chi^{\gamma+1}\frac{1}{\beta}\frac{1}{\frac{1+\chi\tau}{1+\tau}}\right)^{\frac{1}{2(2+\gamma)}}$$

of the entire range $$\chi \leftrightarrow \left(\frac{\chi}{\beta}\right)^{\frac{1}{4}}$$

and at a specific value of number of turns of primary winding ($n_1$) defined by $\chi\delta^{-2}$, the primary winding volt-second product ($\lambda_1$) is adjustable in a bounded region 601 having lower limit about 1 and upper limit defined by a function $\chi\delta^{-2}$. The magnetizing current ($I_{tot}$) is adjustable in a bounded region 603 having lower limit defined by a function $$\chi^{-\left(\frac{\gamma+1}{2}\right)}\beta^{\frac{1}{2}}\delta^{(2+\gamma)}\left(\frac{1+\chi\tau}{1+\tau}\right)^{\frac{1}{2}}$$

and an upper limit defined by a function $$\left(\frac{\chi}{\beta}\right)^{-\frac{1}{2}}\delta^{2}\left(\frac{1+\chi\tau}{1+\tau}\right)^{\frac{1}{2}}.$$

The maximum core magnetic field density ($B_{max}$) is adjustable in a bounded region 605 having lower limit defined by a function $\chi^{-1}\delta^{2}$ and upper limit about 1. The total power loss ($P_{tot}$) is adjustable in a bounded region 607 having lower limit defined by a function $$\chi^{-\gamma}\delta^{2\gamma}\frac{1+\chi\tau}{1+\tau}$$

and upper limit defined by a function $$\frac{1+\chi\tau}{1+\tau}.$$

it must be noted that the regions 601, 603, 605, 607 of improvement, wherein the desired values can be adjusted, are envisaged in relation to respective values of the same reference parameters in the reference component. At each effective diameter ratio ($\delta$) within the range the ratio of the number of turns relative to the number of turns of each winding in the reference transformer is $\chi\delta^{-2}$.

Similarly, and as shown in FIG. 21 within a sub-range $$\left(\chi^{\gamma+1}\frac{1}{\beta}\right)^{\frac{1}{2(2+\gamma)}} \leftrightarrow \left(\frac{\chi}{\beta}\right)^{\frac{1}{4}}$$

of the entire range $$\chi \leftrightarrow \left(\frac{\chi}{\beta}\right)^{\frac{1}{4}}$$

and at a specific value of number of turns of primary winding (n1) defined by $\chi\delta^{-2}$, the primary winding volt-second product ($\lambda_1$) is adjustable in a bounded region 602 having lower limit defined by a function $$\left(\chi^{\gamma+1}\frac{1}{\beta}\delta^{-2(2+\gamma)}\frac{1}{\frac{1+\chi\tau}{1+\tau}}\right)^{\frac{1}{\gamma}}$$

and upper limit defined by a function $\chi\delta^{-2}$. The magnetizing current ($I_{tot}$) is adjustable in a bounded region 604 having lower limit about 1 and upper limit defined by a function $$\left(\frac{\chi}{\beta}\right)^{-\frac{1}{2}}\delta^{2}\left(\frac{1+\chi\tau}{1+\tau}\right)^{\frac{1}{2}}.$$

The maximum core magnetic field density ($B_{max}$) is adjustable in a bounded region 606 having lower limit defined by a function $$\left(\chi\frac{1}{\beta}\delta^{-4}\frac{1}{\frac{1+\chi\tau}{1+\tau}}\right)^{\frac{1}{\gamma}}$$

and upper limit about 1. The total power loss (Ptot) is adjustable in a bounded region 608 having lower limit defined by a function $$\chi\frac{1}{\beta}\delta^{-4}$$

and upper limit defined by a function $$\frac{1+\chi\tau}{1+\tau}.$$

At each effective diameter ratio ($\delta$) within the range the ratio of the number of turns relative to the number of turns of each winding in the reference transformer is $\chi\delta^{-2}$.

The improvement regions 601, 602, 603, 604, 605, 606, 607 and 608 shown in FIG. 21 are, like the regions shown in FIG. 19, defined and shown to be bounded by broken lines represented by the values and functions described above and shown in FIG. 21. The boundary lines, corresponding to the values and functions described and shown for each improvement region 601, 602, 603, 604, 605, 606, 607 and 608 define the bounded regions such that any value between and including the boundary lines may be utilized to design and fabricate a transformer according to the present invention that will be improved, or optimized, relative to the reference transformer in at least one aspect. A desired value of diameter ratio ($\delta$) for a transformer component of the present invention can be any value within these boundaries to provide a transformer component having improved parameters or characteristics relative to the reference transformer.

However, if the diameter ratio (δ) is selected to be outside the limits of the bounded regions 601, 602, 603, 604, 605, 606, 607 and 608 shown (i.e., outside the broken boundary line values corresponding to the functions and values described and shown for each region), the resultant transformer component including the improved higher conductivity composite material will be less desirable than the corresponding value of the reference transformer in at least one aspect. That a higher conductivity composite material may be utilized to provide a transformer that is less desirable than the reference transformer utilizing a conventional conductive material having a lower conductivity (but otherwise similar design) in certain aspects is perhaps a counterintuitive result that is preferably avoided. Thus, the bounded regions shown provide a range of values, within and including the boundaries shown in which the corresponding values of a transformer component of the present invention constructed with values (β) and (δ) is the same or better in terms than the corresponding values of the reference transformer.

The transformer design and fabrication approach of the present invention improves the overall performance of the transformer in relation to a reference transformer, where by using windings made of composite material having carbon nanotube, basic functional parameters of the transformers such as $\lambda_1$, $I_{tot}$, $B_{max}$, and $P_{tot}$ can be improved. Using either of the bounded improvement region graphs shown in FIGS. 19 and 21, various different higher conductivity composite materials can be evaluated for use in constructing improved transformers according to the invention. Once the conductivity of any higher conductivity composite materials proposed for use is known, the values (β) and (δ) may be readily calculated and may be applied to the respective regions shown in FIGS. 19 and 21 as a vertical line within the range of (δ) values shown along the x-axis. Using that vertical lane, which corresponds to the (δ) value for the proposed improved conductivity material, the impact of the proposed material and possible improvements in the transformer design and fabrication using the material can be easily appreciated.

Figure 22:
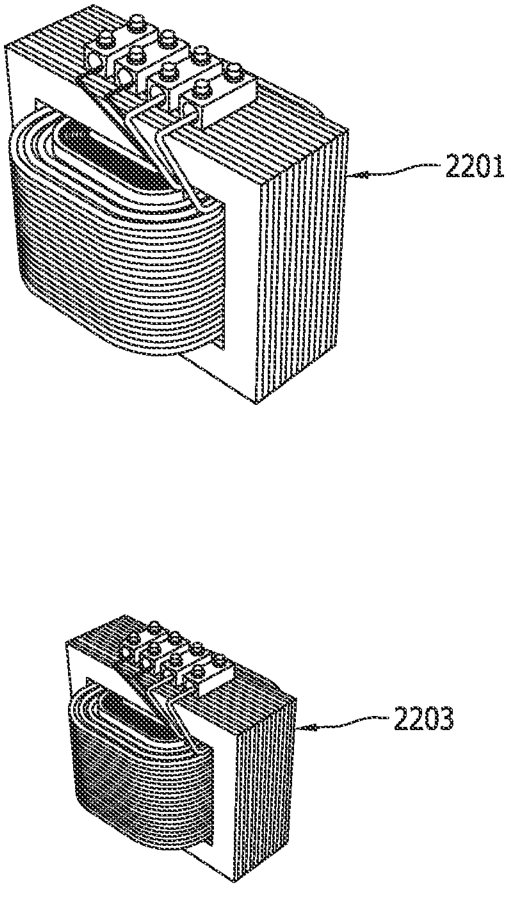
FIG. 22 illustrates a comparative size reduction of an exemplary embodiment of an electromagnetic transformer component formed in accordance with an exemplary embodiment of the present invention including an improved conductivity composite conductor material versus a conventional transformer of a similar configuration.

The technical advantages of the transformer design and fabrication in terms of overall size reduction is apparent in FIG. 22, where transformer 2203 with composite material windings is dimensionally much smaller than reference transformer 2201 which has windings made of copper.

In accordance with exemplary embodiments of the present invention, transformer components employing the concepts described above may be designed and manufactured. As described above, the improvement in the electromagnetic component of the present invention is realized in terms of ratios relative to the corresponding parameter that describes the reference transformer. As explained above, the transformer parameters include $B_{max}$ which represents the ratio of the peak magnetic flux density of the transformer relative to that of the reference transformer, $P_{tot}$ which represents the ratio of total power loss of the transformer relative to that of the reference transformer, $I_{tot}$ which represents the ratio of total magnetizing current of the transformer relative to that of the reference transformer, $\lambda_1$ which represents the ratio of the volt-second product of the transformer relative to that of the reference transformer, $n_j$ which represents the ratio of the number of turns of the respective windings of the transformer relative to those of the reference transformer, and δ represents the ratio of the wire diameter of each winding of the transformer relative to the corresponding wire diameter of the corresponding winding of the reference transformer.

While designing an electromagnetic transformer component in accordance with the present invention, a desired core size improvement is first determined in terms of either a linear reduction ratio ξ where $$1 \geq \xi \geq \beta^{-\frac{1}{8}},$$

or a core height reduction ratio χ where $$1 \geq \chi \geq \beta^{-\frac{1}{8}}.$$

The linear reduction ratio ξ applies to scenarios described above wherein all dimensions of a core are reduced proportionally relative to the reference transformer, whereas the height reduction ratio applies to scenarios described above wherein only the height dimension is decreased. In other words, the height reduction ratio scenario involves a transformer component having a reduced profile as discussed above but having the same footprint as the reference transformer, whereas the linear reduction scenario involves both a reduced footprint and profile relative to the reference transformer.

The upper and lower limits of effective diameter ratio δ is then determined and a performance parameter value of one of the performance parameters (as described above) is chosen or selected to be achieved in the improved transformer of the invention. The value of the performance parameter is selected such that there exists at least one effective diameter ratio within the specified upper and lower limits for the selected value of the performance parameter.

Once one of the transformer parameters is selected to match the reference transformer, the remaining performance parameters are determined which fall within the respective performance improvement regions and correspond to the selected value of effective diameter ratio (δ) and the one parameter.

For instance, in one example a transformer designer first chooses one of the parameters and a value (δ) for which the new design is to be improved. Suppose one chooses $P_{tot}$=0.85 so that the improved transformer of the present invention will operate with 85% of the power losses of the reference transformer design on which it is based. This value ($P_{tot}$=0.85) may be plotted as a horizontal line represented by reference numeral "415" in FIG. 19 within the improvement region for $P_{tot}$. It must be noted that there is now a sub-range of the overall range of δ for which this value of improvement can be achieved in the improved transformer of the invention. Secondly, one chooses a value of δ from this sub-range. At this point everything needed to implement the design of the improved transformer of the invention is defined. At the selected δ value the number of turns $n_1$ is defined, a core is built with the specified windings, and values for $B_{max}$, $I_{tot}$, and $\lambda_1$ are determined by way of the equation set above such that they fall within the performance improvement regions shown in FIG. 19. Since $I_{tot}$ and $\lambda_1$ are input and output circuit dependent, the designer must then operate the transformer consistent with these values.

In accordance with an alternative embodiment, a transformer design may first choose or select a value of effective diameter ratio δ. This is shown by a vertical straight line "417" in FIG. 19 within the bounded regions 402, 404, 406, 408 of the respective four performance parameters. Then the transformer designer chooses or selects a parameter for which a desired target value is to be achieved in the improved transformer of the invention. Once the desired value of the parameter is chosen or selected, its value together with the chosen effective diameter ratio δ and number of turns $n_1$ calculated based on the selected or chosen effective diameter ratio determines the values of the remaining three parameters which fall within their respective performance improvement regions as shown FIG. 19. Again, the transformer component must be operated with the new values of $I_{tot}$ and $\lambda_1$ in order for the improvement regions to be realized.

Figure 23:
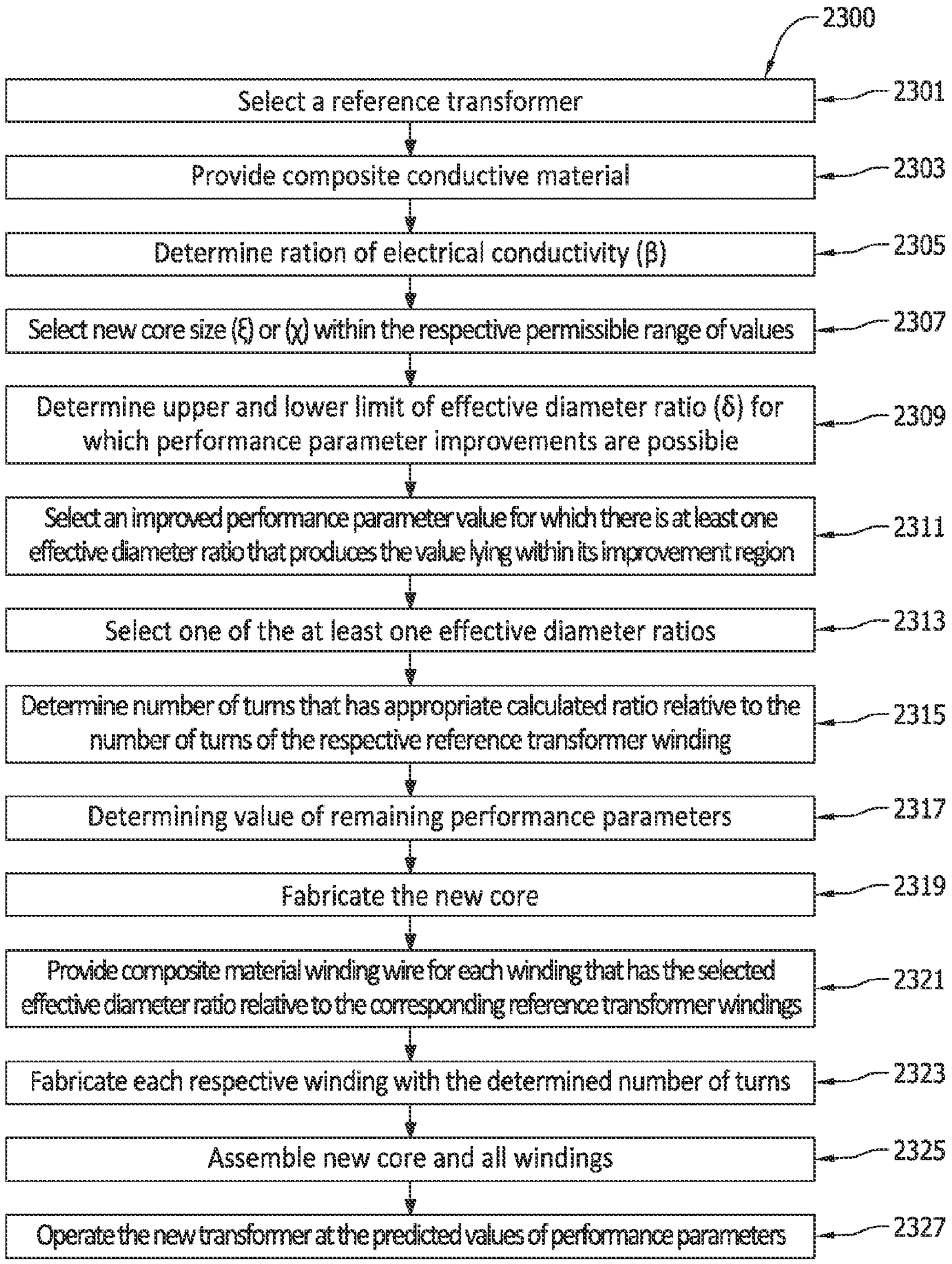
FIG. 23 illustrates a first exemplary flowchart of a method of designing and manufacturing an electromagnetic transformer component formed in accordance with an exemplary embodiment of the present invention.

FIG. 23 illustrates an exemplary flowchart of a method 2300 of designing and manufacturing electromagnetic components in accordance with exemplary embodiments of the present invention.

At step 2301, a reference transformer (or reference transformers) is selected. The reference transformer is a transformer having a reference core made of magnetic material and reference windings made of copper.

At step 2303, a composite conductive material having a conductivity greater than a conductivity of the reference conductor material is provided. The composite material may be any material described above or another material of a greater conductivity than the conductor material utilized in the reference component(s). Varying degrees of conductivity may be provided by different formulations of composite materials. The composite materials may be provided in flexible wire form, sheet form, or in a form that may be deposited on a substrate material. In some embodiments, the step of providing the composite material at step 2303 may include the step of manufacturing the composite conductive material. In other embodiments, the step of providing the composite material may include acquiring the material from another party, whether a manufacturer or a distributor, and making the composite material available for electromagnetic component fabrication.

At step 2305 a ratio is determined of electrical conductivity (β) of the composite conductor provided at step 2303 to the electrical conductivity of the reference conductor material of the reference component. While illustrated as a separate step, step 2303 and step 2305 may in practice be one and the same in certain embodiments. That is, one may select the composite material provided at step 2303 to achieve a desired conductivity ratio for purposes of step 2305. Alternatively, a composite conductive material could be provided and analyzed to determine its conductivity, which can then be used to determine the conductivity ratio.

As shown at step 2307, a new core size is determined with permissible range of values of linear dimension ratio (ξ) or core height ratio (χ) based on determined ratio of electrical conductivity (β). Based on the design requirement, the transformer designer may determine the new core size for the improved transformer of the invention utilizing the improved conductivity material.

As shown at step 2309, an upper limit and lower limit (or range) of an effective diameter ratio of the composite conductive material may be determined. The upper and lower limits are determined from the perspective of identifying a range of values between the limits in which a component parameter may be improved relative to the reference transformer. The determination of the range of an effective diameter ratio (δ) is made in view of the determined ratio of electrical conductivity (β).

As shown at step 2311 one of the component parameter values (primary winding volt-second product, magnetizing current, maximum core magnetic field density, and total power loss), is selected within one of the improvement regions such as those shown in FIGS. 19 and 21. The regions may be derived from theoretical relationships and computation as discussed above. The improved transformer component being designed would therefore have improved values with respect to the reference component regarding the parameters.

The bounded improvement regions may be developed for each respective component parameter or component performance parameters such as those described in the embodiments above, or using other parameters as desired. The improvement regions may be defined for each parameter of interest to include functions of the ratio of electrical conductivity (β) discussed above, which also relates to the effective diameter ratio (δ) as described above. The regions of values may be defined by a function of the ratio of electrical conductivity (β) and the effective diameter ratio (δ) as described above. It is understood that graphs such as those shown in FIGS. 19 and 21 may be helpful to do this, but are not necessary in all cases for the regions to be defined and utilized. The design improvement regions may be provided as a preparatory step to the method 2300 or may be determined as part of the method and provided for reference in the fabrication of an transformer component including the material provided at step 2303. The selected value of performance parameter is a value that is desired to be achieved and this value will have at least one effective diameter ratio (δ) that produces this value. The at least one effective diameter ratio (δ) will generally lie within a sub-range of the effective diameter ratio (δ) determined in step 2311.

At step 2313, the at least one effective diameter ratio is selected. The selected effective diameter value is made with an objective, as described above, of maintaining or improving a parameter of the reference transformer component(s). In some embodiments step 2313 may be consolidated with steps 2303 and 2305. For example, only one composite conductor with a given effective diameter may be provided at step 2303, such that the effective diameter at step 2313 may be effectively dictated by the composite material provided.

As shown at step 2315, a number of turns of the windings fabricated from the improved conductivity material (e.g., the ultra-conductive material discussed above) is determined relative to the copper windings in the reference transformer component.

Once the selections at steps 2311 and 2313 are completed, the remaining parameters of the improved transformer component design are now determined at step 2317.

At step 2319, a core structure is fabricated for the improved transformer of the present invention. In embodiments wherein the core volume is changed from the reference component, the core volume may be proportionally changed (decreased) in all dimensions relative to the reference component while otherwise retaining the same shape as the reference transformer. In certain embodiments, however, only the winding area (WA) in the core may be adjusted relative to the reference conductor while the footprint and the component height remain the same as discussed above. As discussed above, the core structure may be formed in one piece or multiple pieces having the same or different shape.

At step 2321, composite material windings (as described above) are provided for each winding that has the selected at least one effective diameter ratio relative to the corresponding reference transformer windings.

At step 2323, primary and secondary windings are fabricated from the composite material provided at step 2303, having the conductivity determined at step 2305, and having the effective diameter ratio determined at step 2313. The windings are formed with a number of turns required at step 2315 to achieve the desired improvement. Any of the techniques and winding configurations described above may be utilized to construct the winding at step 2323.

At step 2325, the core and windings are assembled to complete the electromagnetic component exhibiting the parameter values selected at steps 2313 and 2315, and 2317. In some embodiments, the steps of 2311, 2313, 2315, 2317, 2319, 2321, and 2323 may occur at the same time. As one such example, in a laminated component construction including magnetic sheets, the magnetic sheets may be pressed around the windings to fabricate the magnetic core structure. As another example, in a laminated component construction including layers successively formed on a preexisting layer, the windings may simultaneously be formed with the magnetic core structure.

At step 2327, the completed transformer component may be connected to circuitry and operated at predefined values of performance parameters associated with core and windings.

While an exemplary method 2300 has been described, the method and process steps may be performed using less than all of the steps shown, with additional steps included and/or the method and process steps may be performed in a different order. Various adaptations are possible within the scope of the pending claims.

Figure 24:
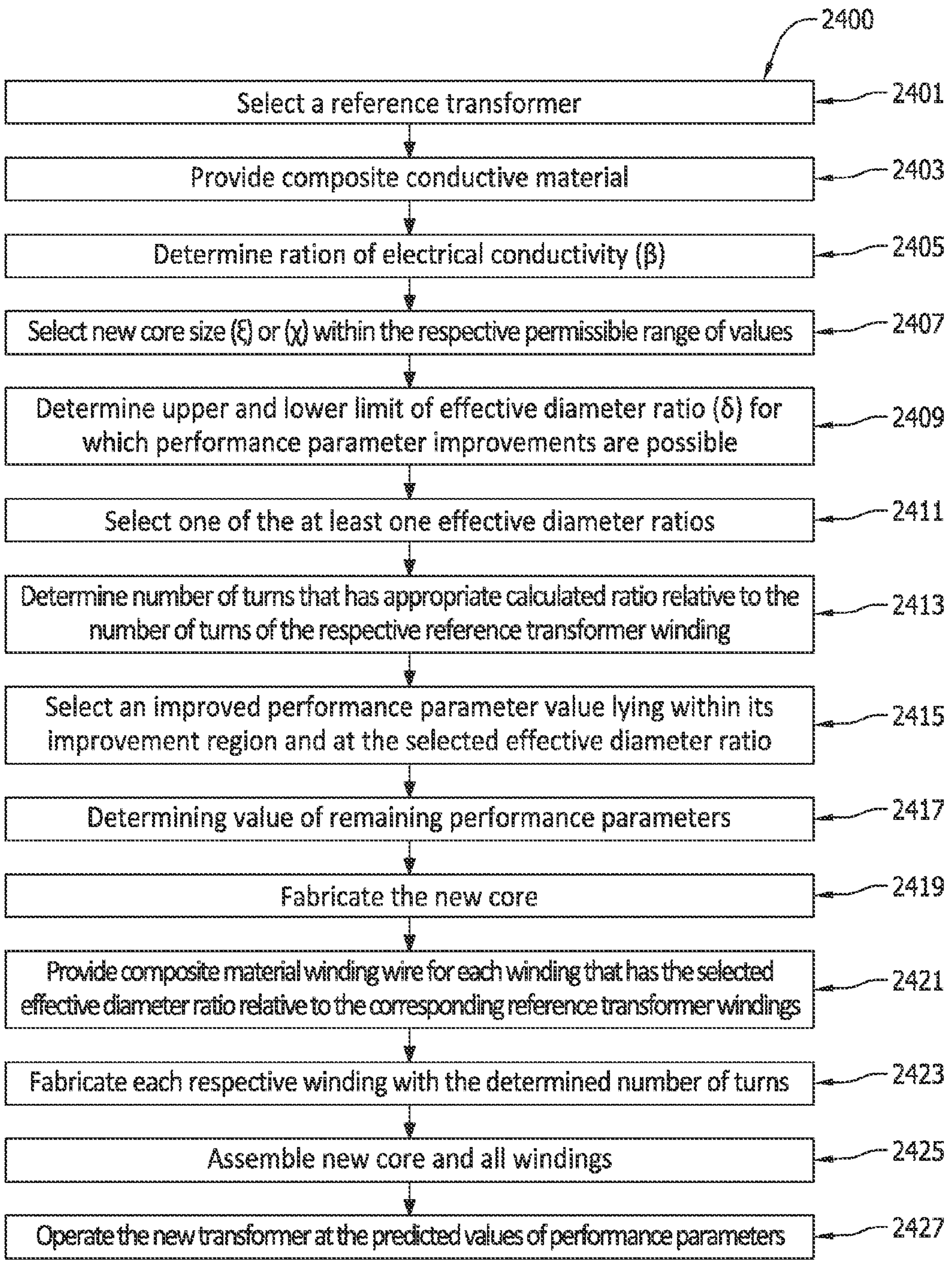
FIG. 24 illustrates a second exemplary flowchart of a method of manufacturing electromagnetic transformer component formed in accordance with an exemplary embodiment of the present invention.

FIG. 24 illustrates an exemplary flowchart of another method 2400 of manufacturing electromagnetic components in accordance with exemplary embodiments of the present invention.

At step 2401, a reference transformer (or reference transformers are selected. The reference transformer is a transformer having reference core made of magnetic material and reference windings made of copper.

At step 2403, am improved conductivity composite conductive material having a conductivity greater than a conductivity of the reference conductor material is provided. The improved conductivity material may be any material described above or another material of a greater conductivity than the conductor material utilized in the reference component(s). Varying degrees of higher conductivity may be provided by different formulations of composite materials. The composite materials may be provided in flexible wire form, sheet form, or in a form that may be deposited on a substrate material. In some embodiments, the step of providing the composite material at step 2403 may include the step of manufacturing the composite conductive material. In other embodiments, the step of providing the composite material may include acquiring the material from another party, whether a manufacturer or a distributor, and making the composite material available for electromagnetic component fabrication.

At step 2405 a ratio is determined of electrical conductivity ($\beta$) of the composite conductor provided at step 2403 to the electrical conductivity of the reference conductor material of for a reference component. While illustrated as a separate step, step 2403 and step 2405 may in practice be one and the same in certain embodiments. That is, one may select the composite material provided at step 2403 to achieve a desired conductivity ratio for purposes of step 2405. Alternatively, a composite conductive material could be provided and analyzed to determine its conductivity, which can then be used to determine the conductivity ratio.

As shown at step 2407, a new core size is determined with permissible range of values of linear dimension ratio ($\xi$) or core height ratio ($\chi$) based on determined ratio of electrical conductivity ($\beta$). Based on the design requirement, the transformer designer determines the new core size.

As shown at step 2409, an upper limit and lower limit (or range) of an effective diameter ratio of the composite conductive material may be determined. The upper and lower limits are determined from the perspective of identifying a range of values between the limits in which a transformer component parameter may be improved relative to the reference transformer. The determination of the range of an effective diameter ratio ($\delta$) is made in view of the determined ratio of electrical conductivity ($\beta$).

At step 2411, the at least one effective diameter ratio is selected based on the improvement(s) desired by the transformer designer. The selected effective diameter ratio is made within the upper and lower limits of the effective diameter ratio.

As shown at step 2413, a number of turns of the ultraconductive windings in the transformer of the invention are determined relative to the copper windings in the reference transformer component. The number of turns are determined for the selected value of effective diameter ratio.

As shown at step 2415 one of the component parameter values (e.g., primary winding volt-second product, magnetizing current, maximum core magnetic field density, and total power loss), is selected within improvement regions such as those shown in FIGS. 19 and 21. The design improvement regions may be derived from theoretical relationships and computation. The transformer of the invention being designed would therefore have improved values with respect to the reference component regarding the corresponding parameters. The parameter whose value is selected at this step is the parameter for which desired target value is to be achieved.

The design improvement regions may be developed for each respective component parameter or component performance parameters such as those described in the embodiments above, or other parameters as desired. The design improvement regions may be defined for each parameter of interest to include functions of the ratio of electrical conductivity ($\beta$) discussed above, which also relates to the effective diameter ratio ($\delta$) as described above. The regions of values may be defined by a function of the ratio of electrical conductivity ($\beta$) and the effective diameter ratio ($\delta$) as described above. It is understood that graphs such as those in FIGS. 19 and 21 may be helpful to do this, but are not necessary in all cases for the regions to be defined and utilized. The regions may be provided as a preparatory step to the method 2400 or may be determined as part of the method and provided for reference in the fabrication of an electromagnetic component including the material provided at step 2403. The selected value of performance parameter is a value that is desired to be achieved and this value will have at least one effective diameter ratio ($\delta$) that produces this value. The at least one effective diameter ratio ($\delta$) will generally lie within a sub-range of the effective diameter ratio ($\delta$) determined in step 2411.

Once the selections at steps 2411 and 2415 are made, the remaining parameters of the component design are now determined at step 2417 which lie within their respective regions of performance improvement.

At step 2419, a core structure is fabricated. In embodiments wherein the core volume is changed from the reference component, the core volume may be proportionally changed (decreased) in all dimensions relative to the reference component while otherwise retaining the same shape as the reference transformer. In certain embodiments, however, only the winding area (WA) in the core may be adjusted relative to the reference conductor while the footprint and the component height remain the same as discussed above. As discussed above, the core structure may be formed in one piece or multiple pieces having the same or different shape.

At step 2421, composite material windings (as described above) are provided for each winding that has the selected at least one effective diameter ratio relative to the corresponding reference transformer windings.

At step 2423, primary and secondary windings are fabricated from the composite material provided at step 2403, having the conductivity determined at step 2405, and having the effective diameter ratio determined at step 2411. The windings are formed with a number of turns required at step 2413 to achieves the desired improvement. Any of the techniques and winding configurations described above may be utilized to construct the winding at step 2323.

At step 2425, the core and winding are assembled to complete the electromagnetic component exhibiting the parameter values selected at steps 2411 and 2415, and 2417. In some embodiments, the steps of 2411, 2413, 2415, 2417, 2419, 2421, and 2423 may occur at the same time. As one such example, in a laminated component construction including magnetic sheets, the magnetic sheets may be pressed around the windings to fabricate the magnetic core structure. As another example, in a laminated component construction including layers successively formed on a preexisting layer, the windings may simultaneously be formed with the magnetic core structure. The component completed may be configured as a transformer.

At step 2427, the completed component (i.e. the transformer) is operated at predefined values of performance parameters associated with core and windings.

While an exemplary method 2400 has been described, the method and process steps may be performed using less than all of the steps shown, with additional steps included and/or the method and process steps may be performed in a different order. Various adaptations are possible within the scope of the pending claims.

Electromagnetic components such as transformers formed according to the present invention may therefore be readily obtained in view of the teachings of the present disclosure, without necessarily undertaking the laborious task of theoretical component design, and without necessarily incurring expensive and time consuming experimentation of new component constructions. Improved transformers having better performance may be provided at relatively low cost while continuing to reduce the physical package size of transformers and/or improving component performance in different aspects or a combination of aspects. In view of the inventive design approach described above, a vast number of copper-based transformer components can be readily translated to new and improved transformer devices using ultra-conductive composite materials. Transformer designs can rather easily be optimized with respect to one or more of a plurality of parameters. The benefits of such components according to the invention are perhaps most significant for miniaturized power transformer components used in circuit boards of increasingly smaller and powerful electronic devices, but the benefits accrue to other types of transformers as well.

The benefits and advantages of the inventive concepts are now believed to have been amply illustrated in relation to the exemplary embodiments disclosed.

An embodiment of an electromagnetic transformer component has been disclosed including: a magnetic core; and at least two conductors fabricated from a composite conductive material including carbon nanotubes, the at least two conductors respectively shaped to define a primary winding and at least one secondary completing a respectively different number of turns to provide a step up or step down current or voltage output when the at least two conductors are assembled with the magnetic core and connected to electrical circuitry; wherein the at least two conductors respectively have a cross sectional area that is determined relative to at least two reference conductors in a reference transformer component.

Optionally, a ratio of an electrical conductivity (β) of the at least two conductors to an electrical conductivity of the at least two reference conductors in the reference electromagnetic component is greater than 1; and the ratio of electrical conductivity (β) may define an upper limit and a lower limit of an effective diameter that corresponds to the cross sectional area of the at least two conductors. The transformer component may be configured to operate with performance parameters selected from the group of a primary winding volt-second product, magnetizing current, maximum core magnetic field density, total power loss, and a number of turns for the windings when connected to electrical circuitry; and at least one of the performance parameters may be within bounded improvement regions defined by at least one function of a ratio of the electrical conductivity (β), an effective diameter ratio (δ) of the at least two conductors relative to the at least two reference conductors, a linear dimension ratio (ξ) of the magnetic core relative to a reference core, and a material constant (γ) of the magnetic material of the core. A performance value of at least one other performance parameter may be selected to be within a respective bounded improvement region defined by the electrical conductivity (β), the effective diameter ratio (δ), the linear dimension ratio (ξ), and the material constant (γ) of the magnetic material of the core.

Optionally, the ratio of electrical conductivity (β) may be within the range of about 1.1 to about 10. The composite material including carbon nanotubes may be an ultra-conductive copper composite material. The linear dimension ratio (ξ) of the conductor relative to the reference conductor may be within a range defined between and including a lower boundary value defined by a function $\beta^{(-1/8)}$ and an upper boundary value of about 1. The effective diameter ratio (δ) of the conductor relative to the reference conductor may be within a range defined between and including an upper boundary value defined by a function $\xi^2$ and a lower boundary value of about $\beta^{(-1/4)}$.

The effective diameter ratio (δ) of the conductor relative to the reference conductor may optionally be within a range defined between and including a lower boundary value defined by a function $$\left(\xi^{4\gamma}\frac{1}{\beta}\right)^{\frac{1}{2(2+\gamma)}}$$

and an upper boundary value defined by a function $\xi^2$. A value of the number of turns the primary winding and at least one secondary winding, relative to the reference transformer, may be defined by a function $\xi^2\delta^{-2}$. A value of the primary winding volt-second product is within a bounded improvement region defined between and including a lower boundary value of 1 and an upper boundary value defined by a function $\xi^4\delta^{-2}$. A value of magnetizing current may be within a bounded improvement region defined between and including a lower boundary value defined by a function $$\xi^{-2\gamma}\beta^{\frac{1}{2}}\delta^{(2+\gamma)}$$

and an upper boundary value defined by a function $$\beta^{\frac{1}{2}}\delta^{2}.$$

A value of maximum core magnetic field density may be within a bounded improvement region defined between and including a lower boundary value defined by a function $$\left(\xi^{-4\gamma}\delta^{2(\gamma)}\right)^{\frac{1}{\gamma}}$$

and an upper limit of 1. A value of total power loss may be within a bounded improvement region defined between and including a lower boundary value defined by a function $\delta^{3-4\gamma}\delta^{2\gamma}$ and an upper boundary value defined by a function $\xi^{3}$.

An effective diameter ratio (δ) of the conductor relative to the reference conductor may be within a range defined between and including a function $$\left(\xi^{4\gamma}\frac{1}{\beta}\right)^{\frac{1}{2(2+\gamma)}}$$

and a function $$\beta^{-\frac{1}{4}}.$$

A value of the number of turns for the primary and secondary winding, relative to the reference conductor, may be defined by a function $\xi^{2}\delta^{-2}$. A value of the primary winding volt-second product may be within a bounded improvement region defined between and including a lower boundary value defined by a function $$\left(\xi^{4\gamma}\frac{1}{\beta}\delta^{-2(2+\gamma)}\right)^{\frac{1}{\gamma}}$$

and an upper boundary value defined by a function $\xi^{4}\delta^{-2}$. A value of magnetizing current may be within a bounded improvement region defined between and including a lower boundary value of 1 and an upper boundary value defined by a function $$\beta^{\frac{1}{2}}\delta^{2}.$$

A value of maximum core magnetic field density may be within a bounded improvement region defined between and including a lower boundary value defined by a function $$\left(\frac{1}{\beta}\delta^{-4}\right)^{\frac{1}{\gamma}}$$

and an upper boundary value of 1. A value of total power loss may be within a bounded improvement region defined between and including a lower boundary value defined by a function $$\xi^{3}\frac{1}{\beta}\delta^{-4}$$

and an upper boundary value defined by a function $\xi^{3}$.

The magnetic core optionally has a shape that is the same as that of a reference core of the reference transformer and a volume ratio of the volume of the core relative to reference volume of the reference core of the reference transformer is defined by a function $\xi^{3}$. The transformer component may be configured to operate with performance parameters selected from the group of a primary winding volt-second product, magnetizing current, maximum core magnetic field density, total power loss, and a number of turns for the of windings when connected to electrical circuitry; and at least one of the performance parameters may be within bounded improvement regions defined by and including at least one function of the ratio of the electrical conductivity (β), an effective diameter ratio (δ) of the conductor relative to the reference conductor material, a core height reduction ratio (χ) of the magnetic core relative to a reference core, and a material constant (γ) of the magnetic material of the core. The material constant (γ) of the magnetic material of the core may be equal to that of the reference core of the reference transformer. The core height ratio (χ) may be within a range defined between and including a function $\beta^{(-1/3)}$ and 1. The effective diameter ratio (δ) may be within a range defined between and including a function $(\chi/\beta)^{(1/4)}$ and χ. The effective diameter ratio (δ) may within a range defined by and including a function χ and $$\left(\chi^{\gamma+1}\frac{1}{\beta}\frac{1}{\frac{1+\chi\tau}{1+\tau}}\right)^{\frac{1}{2(2+\gamma)}}.$$

A number of turns value for the primary and secondary windings may be defined by a function $\chi\delta^{-2}$. A value of the primary winding volt-second product may be within a bounded improvement region defined between and including a lower boundary value of 1 and an upper boundary value defined by a function $\chi\delta^{-2}$. A value of magnetizing current may be within a bounded improvement region defined between and including a lower boundary value defined by a function $$\chi^{-\left(\frac{\gamma+1}{2}\right)}\beta^{\frac{1}{2}}\delta^{(2+\gamma)}\left(\frac{1+\chi\tau}{1+\tau}\right)^{\frac{1}{2}}$$

and an upper boundary value defined by a function $$\left(\frac{\chi}{\beta}\right)^{-\frac{1}{2}}\delta^2\left(\frac{1+\chi\tau}{1+\tau}\right)^{\frac{1}{2}}.$$

A value of maximum core magnetic field density may be within a bounded improvement region defined between and including a function $\chi^{-1}\delta^2$ and 1. A value of total power loss may be within a bounded improvement region defined between and including a function $$\chi^{-\gamma}\delta^{2\gamma}\frac{1+\chi\tau}{1+\tau}$$

and a function $$\frac{1+\chi\tau}{1+\tau}.$$

The effective diameter ratio (δ) may be within a range defined by and including a function $$\left(\chi^{\gamma+1}\frac{1}{\beta}\frac{1}{\frac{1+\chi\tau}{1+\tau}}\right)^{\frac{1}{2(2+\gamma)}}$$

and a function $$\left(\frac{\chi}{\beta}\right)^{\frac{1}{4}}.$$

A value of the number of turns for the primary and secondary windings, relative to the reference transformer, may be defined by a function $\chi\delta^{-2}$. A value of the primary winding volt-second product may be within a bounded improvement region defined between and including a function $$\left(\chi^{\gamma+1}\frac{1}{\beta}\delta^{-2(2+\gamma)}\frac{1}{\frac{1+\chi\tau}{1+\tau}}\right)^{\frac{1}{\gamma}}$$

and a function $\chi\delta^{-2}$. A value of magnetizing current may be within a bounded improvement region defined between and including 1 and a function $$\left(\frac{\chi}{\beta}\right)^{-\frac{1}{2}}\delta^2\left(\frac{1+\chi\tau}{1+\tau}\right)^{\frac{1}{2}}.$$

A value of maximum core magnetic field density may be within a bounded improvement region defined between and including a function $$\left(\chi\frac{1}{\beta}\delta^{-4}\frac{1}{\frac{1+\chi\tau}{1+\tau}}\right)^{\frac{1}{\gamma}}$$

and 1. A value of total power loss may be within a bounded improvement region defined between and including a function $$\chi\frac{1}{\beta}\delta^{-4}$$

and a function $$\frac{1+\chi\tau}{1+\tau}.$$

An embodiment of a method of manufacturing an electromagnetic transformer component has been disclosed including: selecting a reference transformer having reference core made of a reference magnetic material and reference windings made of a reference conductor material; providing a composite conductive material having a conductivity greater than a conductivity of the reference conductor material; determining a ratio of electrical conductivity (β) of the composite conductor to the electrical conductivity of the reference conductor material; determining a new core size with permissible range of values of linear dimension ratio (ξ) or core height ratio (χ) based on the determined ratio of electrical conductivity (β); and based on the determined ratio of electrical conductivity (β), determining an upper limit and lower limit of an effective diameter ratio (δ) of the composite conductive material relative to the reference conductor material.

Optionally, the transformer component may be configured to operate based on performance parameters selected from the group of a primary winding volt-second product, magnetizing current, maximum core magnetic field density, total power loss, and a number of turns for the windings when connected to electrical circuitry; and the method may further include selecting a value of one of the performance parameters within a respective bounded region of improvement values defined by a function of at least one of the ratio of electrical conductivity (β) and the effective diameter ratio (δ).

The method may also include: selecting an effective diameter ratio within the determined upper and lower limit of the effective diameter ratio (δ); determining values of the remaining performance parameters; fabricating a magnetic core; fabricating at least two windings from the provided composite conductive material having an effective diameter, the effective diameter being determined based on the effective diameter ratio (δ); and assembling the at least two windings with the fabricated magnetic core and the fabricated windings having the selected number of turns. Selecting one of the performance parameters from one of the respective bounded region of improvement values may include selecting from each bounded region of values that is defined by at least one boundary value that is a function of at least one of the ratio of electrical conductivity (β) and the effective diameter ratio (δ).

The method may include fabricating an transformer component having a selected effective diameter and the selected conductivity value to achieve at least one of the selected performance parameters. The transformer component may be configured to operate based on performance parameters selected from the group of a primary winding volt-second product, magnetizing current, maximum core magnetic field density, total power loss, and a number of turns for the windings when connected to electrical circuitry; and the method may further comprise selecting an effective diameter ratio within the determined upper and lower limit of the effective diameter ratio (δ).

The method may also include determining a number of turns value based on the selected effective diameter ratio (δ). The method may also include: selecting a value of one of the performance parameters within a respective bounded region of improvement values defined by a function of at least one of the ratio of electrical conductivity (β) and the effective diameter ratio (δ); determining values of the remaining performance parameters; fabricating a magnetic core; fabricating at least two windings from the provided composite conductive material having an effective diameter, the effective diameter being determined based on the effective diameter ratio (δ); and assembling the at least two windings with the fabricated magnetic core and the fabricated windings having the selected number of turns. Selecting at least one of the performance parameters from one of the respective bounded regions of improvement values may include selecting from each bounded region of improvement values is defined by at least one limit that is a function of at least one of the ratio of electrical conductivity (β) and the effective diameter ratio (δ).

The method may include fabricating an electromagnetic transformer component having the selected effective diameter and the selected conductivity value to achieve at least one of the selected performance parameters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electromagnetic transformer component comprising:

a magnetic core; and at least two conductors fabricated from a composite conductive material including carbon nanotubes, the at least two conductors respectively shaped to define a primary winding and at least one secondary completing a respectively different number of turns to provide a step up or step down current or voltage output when the at least two conductors are assembled with the magnetic core and connected to electrical circuitry;

wherein the at least two conductors respectively have a cross sectional area that is determined relative to at least two reference conductors in a reference transformer component;

wherein a ratio of an electrical conductivity (β) of the at least two conductors to an electrical conductivity of the at least two reference conductors in the reference electromagnetic component is greater than 1; and wherein the ratio of electrical conductivity (β) defines an upper limit and a lower limit of an effective diameter that corresponds to the cross sectional area of the at least two conductors.

2. The electromagnetic transformer component of claim 1:

wherein the transformer component is configured to operate with performance parameters selected from the group of a primary winding volt-second product, magnetizing current, maximum core magnetic field density, total power loss, and a number of turns for the windings when connected to electrical circuitry; and wherein at least one of the performance parameters is within bounded improvement regions defined by at least one function of a ratio of the electrical conductivity (β), an effective diameter ratio (δ) of the at least two conductors relative to the at least two reference conductors, a linear dimension ratio (ξ) of the magnetic core relative to a reference core, and a material constant (γ) of the magnetic material of the core.

3. The electromagnetic transformer component of claim 2, wherein a performance value of at least one other performance parameter is selected to be within a respective bounded improvement region defined by the electrical conductivity (β), the effective diameter ratio (δ), the linear dimension ratio (ξ), and the material constant (γ) of the magnetic material of the core.

4. The electromagnetic transformer component of claim 2, wherein the linear dimension ratio (ξ) of the conductor relative to the reference conductor is within a range defined between and including a lower boundary value defined by a function $\beta^{(-1/8)}$ and an upper boundary value of about 1.

5. The electromagnetic transformer component of claim 2, wherein the effective diameter ratio (δ) of the conductor relative to the reference conductor is within a range defined between and including an upper boundary value defined by a function $\xi^2$ and a lower boundary value of about $\beta^{(-1/4)}$.

6. The electromagnetic transformer component of claim 2, wherein the effective diameter ratio (δ) of the conductor relative to the reference conductor is within a range defined between and including a lower boundary value defined by a function $$\left(\xi^{4\gamma}\frac{1}{\beta}\right)^{\frac{1}{2(2+\gamma)}}$$

and an upper boundary value defined by a function $\xi^2$.

7. The electromagnetic transformer component of claim 6, wherein a value of the number of turns the primary winding and at least one secondary winding, relative to the reference transformer, is defined by a function $\xi^2\delta^{-2}$.

8. The electromagnetic transformer component of claim 6, wherein a value of the primary winding volt-second product is within a bounded improvement region defined between and including a lower boundary value of 1 and an upper boundary value defined by a function $\xi^4\delta^{-2}$.

9. The electromagnetic transformer component of claim 6, wherein a value of magnetizing current is within a bounded improvement region defined between and including a lower boundary value defined by a function $$\xi^{-2\gamma}\beta\frac{1}{2}\delta^{(2+\gamma)}$$

and an upper boundary value defined by a function $$\beta^{\frac{1}{2}}\delta^{2}.$$

10. The electromagnetic transformer component of claim 6, wherein a value of maximum core magnetic field density is within a bounded improvement region defined between and including a lower boundary value defined by a function $$(\xi^{-4\gamma}\delta^{2(\gamma)})^{\frac{1}{\gamma}}$$

and an upper limit of 1.

11. The electromagnetic transformer component of claim 6, wherein a value of total power loss is within a bounded improvement region defined between and including a lower boundary value defined by a function $\xi^{3-4\gamma}\delta^{2\gamma}$ and an upper boundary value defined by a function $\xi^{3}$.

12. The electromagnetic transformer component of claim 2, wherein an effective diameter ratio ($\delta$) of the conductor relative to the reference conductor is within a range defined between and including a function $$\left(\xi^{4\gamma}\frac{1}{\beta}\right)^{\frac{1}{2(2+\gamma)}}$$

and a function $$\beta^{-\frac{1}{4}}.$$

13. The electromagnetic transformer component of claim 12, wherein a value of the number of turns for the primary and secondary winding, relative to the reference conductor, is defined by a function $\xi^{2}\delta^{-2}$.

14. The electromagnetic transformer component of claim 12, wherein a value of the primary winding volt-second product is within a bounded improvement region defined between and including a lower boundary value defined by a function $$\left(\xi^{4\gamma}\frac{1}{\beta}\delta^{-2(2+\gamma)}\right)^{\frac{1}{\gamma}}$$

and an upper boundary value defined by a function $\xi^{4}\delta^{-2}$.

15. The electromagnetic transformer component of claim 12, wherein a value of magnetizing current is within a bounded improvement region defined between and including a lower boundary value of 1 and an upper boundary value defined by a function $$\beta^{\frac{1}{2}}\delta^{2}.$$

16. The electromagnetic transformer component of claim 12, wherein a value of maximum core magnetic field density is within a bounded improvement region defined between and including a lower boundary value defined by a function $$\left(\frac{1}{\beta}\delta^{-4}\right)^{\frac{1}{\gamma}}$$

and an upper boundary value of 1.

17. The electromagnetic transformer component of claim 12, wherein a value of total power loss is within a bounded improvement region defined between and including a lower boundary value defined by a function $$\xi^{3}\frac{1}{\beta}\delta^{-4}$$

and an upper boundary value defined by a function $\xi^{3}$.

18. The electromagnetic transformer component of claim 1, wherein the ratio of electrical conductivity ($\beta$) is within the range of about 1.1 to about 10.

19. The electromagnetic transformer component of claim 18, wherein the composite material including carbon nanotubes is an ultra-conductive copper composite material.

20. The electromagnetic transformer component of claim 1, wherein the magnetic core has a shape that is the same as that of a reference core of the reference transformer and a volume ratio of the volume of the core relative to reference volume of the reference core of the reference transformer is defined by a function $\xi^{3}$.

21. The electromagnetic transformer component of claim 1:

wherein the transformer component is configured to operate with performance parameters selected from the group of a primary winding volt-second product, magnetizing current, maximum core magnetic field density, total power loss, and a number of turns for the of windings when connected to electrical circuitry; and wherein at least one of the performance parameters is within bounded improvement regions defined by and including at least one function of the ratio of the electrical conductivity ($\beta$), an effective diameter ratio ($\delta$) of the conductor relative to the reference conductor material, a core height reduction ratio ($\chi$) of the magnetic core relative to a reference core, and a material constant ($\gamma$) of the magnetic material of the core.

22. The electromagnetic transformer component as set forth in claim 21, wherein the material constant ($\gamma$) of the magnetic material of the core is equal to that of the reference core of the reference transformer.

23. The electromagnetic transformer component as set forth in claim 21, wherein the core height ratio ($\chi$) is within a range defined between and including a function $\beta^{(-1/3)}$ and 1.

24. The electromagnetic transformer component as set forth in claim 21, wherein the effective diameter ratio (δ) is within a range defined between and including a function $(\chi/\beta)^{(1/4)}$ and $\chi$.

25. The electromagnetic transformer component as set forth in claim 24, wherein the effective diameter ratio (δ) is within a range defined by and including a function $\chi$ and $$\left(\chi^{\gamma+1}\frac{1}{\beta}\frac{1}{\frac{1+\chi\tau}{1+\tau}}\right)^{\frac{1}{2(2+\gamma)}}.$$

26. The electromagnetic transformer component of claim 24, wherein a number of turns value for the primary and secondary windings is defined by a function $\chi\delta^{-2}$.

27. The electromagnetic transformer component of claim 24, wherein a value of the primary winding volt-second product is within a bounded improvement region defined between and including a lower boundary value of 1 and an upper boundary value defined by a function $\chi\delta^{-2}$.

28. The electromagnetic transformer component of claim 24, wherein a value of magnetizing current is within a bounded improvement region defined between and including a lower boundary value defined by a function $$\chi^{-\left(\frac{\gamma+1}{2}\right)}\beta^{\frac{1}{2}}\delta^{(2+\gamma)}\left(\frac{1+\chi\tau}{1+\tau}\right)^{\frac{1}{2}}$$

and an upper boundary value defined by a function $$\left(\frac{\chi}{\beta}\right)^{-\frac{1}{2}}\delta^{2}\left(\frac{1+\chi\tau}{1+\tau}\right)^{\frac{1}{2}}.$$

29. The electromagnetic transformer component of claim 24, wherein a value of maximum core magnetic field density is within a bounded improvement region defined between and including a function $\chi^{-1}\delta^{2}$ and 1.

30. The electromagnetic transformer component of claim 24, wherein a value of total power loss is within a bounded improvement region defined between and including a function $$\chi^{-\gamma}\delta^{2\gamma}\frac{1+\chi\tau}{1+\tau}$$

and a function $$\frac{1+\chi\tau}{1+\tau}.$$

31. The electromagnetic transformer component as set forth in claim 21, wherein the effective diameter ratio (δ) is within a range defined by and including a function $$\left(\chi^{\gamma+1}\frac{1}{\beta}\frac{1}{\frac{1+\chi\tau}{1+\tau}}\right)^{\frac{1}{2(2+\gamma)}}$$

and a function $$\left(\frac{\chi}{\beta}\right)^{\frac{1}{4}}.$$

32. The electromagnetic transformer component of claim 31, wherein a value of the number of turns for the primary and secondary windings, relative to the reference transformer, is defined by a function $\chi\delta^{-2}$.

33. The electromagnetic transformer component of claim 31, wherein a value of the primary winding volt-second product is within a bounded improvement region defined between and including a function $$\left(\chi^{\gamma+1}\frac{1}{\beta}\delta^{-2(2+\gamma)}\frac{1}{\frac{1+\chi\tau}{1+\tau}}\right)^{\frac{1}{\gamma}}$$

and a function $\chi\delta^{-2}$.

34. The electromagnetic transformer component of claim 31, wherein a value of magnetizing current is within a bounded improvement region defined between and including 1 and a function $$\left(\frac{\chi}{\beta}\right)^{-\frac{1}{2}}\delta^{2}\left(\frac{1+\chi\tau}{1+\tau}\right)^{\frac{1}{2}}.$$

35. The electromagnetic transformer component of claim 31, wherein a value of maximum core magnetic field density is within a bounded improvement region defined between and including a function $$\left(\chi\frac{1}{\beta}\delta^{-4}\frac{1}{\frac{1+\chi\tau}{1+\tau}}\right)^{\frac{1}{\gamma}}$$

and 1.

36. The electromagnetic transformer component of claim 31, wherein a value of total power loss is within a bounded improvement region defined between and including a function $$\chi\frac{1}{\beta}\delta^{-4}$$

and a function $$\frac{1+\chi\tau}{1+\tau}.$$

37. A method of manufacturing an electromagnetic transformer component comprising:

selecting a reference transformer having reference core made of a reference magnetic material and reference windings made of a reference conductor material;

providing a composite conductive material having a conductivity greater than a conductivity of the reference conductor material;

determining a ratio of electrical conductivity (β) of the composite conductor to the electrical conductivity of the reference conductor material;

determining a new core size with permissible range of values of linear dimension ratio (ξ) or core height ratio (χ) based on the determined ratio of electrical conductivity (β); and based on the determined ratio of electrical conductivity (β), determining an upper limit and lower limit of an effective diameter ratio (δ) of the composite conductive material relative to the reference conductor material.

38. The method of claim 37, wherein the transformer component is configured to operate based on performance parameters selected from the group of a primary winding volt-second product, magnetizing current, maximum core magnetic field density, total power loss, and a number of turns for the windings when connected to electrical circuitry; and wherein the method further comprises selecting a value of one of the performance parameters within a respective bounded region of improvement values defined by a function of at least one of the ratio of electrical conductivity (β) and the effective diameter ratio (δ).

39. The method of claim 37, further comprising:

selecting an effective diameter ratio within the determined upper and lower limit of the effective diameter ratio (δ);

determining values of the remaining performance parameters;

fabricating a magnetic core;

fabricating at least two windings from the provided composite conductive material having an effective diameter, the effective diameter being determined based on the effective diameter ratio (δ); and assembling the at least two windings with the fabricated magnetic core and the fabricated windings having the selected number of turns.

40. The method of claim 39, further comprising fabricating an transformer component having a selected effective diameter and the selected conductivity value to achieve at least one of the selected performance parameters.

41. The method of claim 37, wherein selecting one of the performance parameters from one of the respective bounded region of improvement values, wherein each bounded region of values is defined by at least one boundary value that is a function of at least one of the ratio of electrical conductivity (β) and the effective diameter ratio (δ).

42. The method of claim 37, wherein the transformer component is configured to operate based on performance parameters selected from the group of a primary winding volt-second product, magnetizing current, maximum core magnetic field density, total power loss, and a number of turns for the windings when connected to electrical circuitry; and wherein the method further comprises selecting an effective diameter ratio within the determined upper and lower limit of the effective diameter ratio (δ).

43. The method of claim 42, further comprising determining a number of turns value based on the selected effective diameter ratio (δ).

44. The method of claim 43, further comprising:

selecting a value of one of the performance parameters within a respective bounded region of improvement values defined by a function of at least one of the ratio of electrical conductivity (β) and the effective diameter ratio (δ);

determining values of the remaining performance parameters;

fabricating a magnetic core;

fabricating at least two windings from the provided composite conductive material having an effective diameter, the effective diameter being determined based on the effective diameter ratio (δ); and assembling the at least two windings with the fabricated magnetic core and the fabricated windings having the selected number of turns.

45. The method of claim 44, wherein selecting at least one of the performance parameters from one of the respective bounded regions of improvement values, wherein each bounded region of improvement values is defined by at least one limit that is a function of at least one of the ratio of electrical conductivity (β) and the effective diameter ratio (δ).

46. The method of claim 44, further comprising fabricating an electromagnetic transformer component having the selected effective diameter and the selected conductivity value to achieve at least one of the selected performance parameters.

* * * * *